United States Patent
Fly et al.

(10) Patent No.: US 10,762,444 B2
(45) Date of Patent: Sep. 1, 2020

(54) REAL-TIME DRIFT DETECTION IN MACHINE LEARNING SYSTEMS AND APPLICATIONS

(71) Applicant: Quickpath Analytics, Inc., San Antonio, TX (US)

(72) Inventors: Edward Alexander Fly, San Antonio, TX (US); Trent McDaniel, San Antonio, TX (US)

(73) Assignee: Quickpath, Inc., San Antonio, TX (US)

( * ) Notice: Subject to any disclaimer, the term of this patent is extended or adjusted under 35 U.S.C. 154(b) by 0 days.

(21) Appl. No.: 16/563,805

(22) Filed: Sep. 6, 2019

(65) Prior Publication Data

US 2020/0082296 A1 Mar. 12, 2020

Related U.S. Application Data

(63) Continuation-in-part of application No. 16/396,605, filed on Apr. 26, 2019, now Pat. No. 10,474,689.

(60) Provisional application No. 62/727,746, filed on Sep. 6, 2018, provisional application No. 62/727,760, filed on Sep. 6, 2018.

(51) Int. Cl.
*G06N 20/00* (2019.01)
*G06F 11/32* (2006.01)
*G06F 17/18* (2006.01)

(52) U.S. Cl.
CPC ........... *G06N 20/00* (2019.01); *G06F 11/327* (2013.01); *G06F 17/18* (2013.01)

(58) Field of Classification Search
CPC ........ G06N 20/00; G06F 11/327; G06F 17/18
See application file for complete search history.

(56) References Cited

U.S. PATENT DOCUMENTS

2006/0282705 A1* 12/2006 Lopez ............... G06F 11/3447
714/27

OTHER PUBLICATIONS

Kyosuke Nishida, LEarning and Detecting Concept Drift, 2008, hokkaido university (Year: 2008).*
Gama et al, A Survaey on Concept Drift Adaptation, 2014, ACM Computing Surveys, Apr. 2014, pp. 16 and 17 (Year: 2014).*

* cited by examiner

*Primary Examiner* — Austin Hicks
(74) *Attorney, Agent, or Firm* — Shah IP Law, PLLC

(57) ABSTRACT

The present disclosure is for systems and methods for connecting offline machine learning training systems with online near-real time machine learning scoring systems. It is not trivial to connect an offline training environment with an online scoring environment. For example, offline training environments are usually static and contain large amounts of historical data that is needed for the initial training of models. Once trained, the model algorithms are then migrated into an online scoring environment for transactional or event based scoring. This migration effectively breaks the connection between the data in the offline environment and the model now running in the online environment. When new or shifting data occurs in the online environment, the static model running in the online environment goes unaltered to the changing inputs. The present disclosure solves the issues that are caused by the break in the offline and online environments.

15 Claims, 27 Drawing Sheets

| Model Name | Cust ID | State | Age Band | Gender | ... Var N | Score |
|---|---|---|---|---|---|---|
| Customer Churn Model v2 | 1 | AK | 20-30 | M | xyz | 0.923 |
| Customer Churn Model v2 | 2 | GA | 20-30 | F | xyz | 0.875 |
| Customer Churn Model v2 | 3 | GA | 30-40 | M | xyz | 0.722 |
| Customer Churn Model v2 | 4 | TX | 30-40 | F | xyz | 0.694 |
| Customer Churn Model v2 | 5 | TX | 30-40 | F | xyz | 0.694 |
| Customer Churn Model v2 | 6 | CA | 40-50 | M | xyz | 0.555 |
| Customer Churn Model v2 | 7 | CA | 40-50 | M | xyz | 0.555 |
| Customer Churn Model v2 | ... | ... | ... | ... | ... | ... |
| Customer Churn Model v2 | N | CA | 40-50 | M | xyz | 0.334 |

FIG. 9A

| Model Name | Variable Combination Checksum | State | Age Band | Gender | ... Var N | Score |
|---|---|---|---|---|---|---|
| Customer Churn Model v2 | xxxyyyzzz00000001 | AK | 20-30 | M | xyz | 0.923 |
| Customer Churn Model v2 | xxxyyyzzz00000002 | GA | 20-30 | F | xyz | 0.875 |
| Customer Churn Model v2 | xxxyyyzzz00000003 | GA | 30-40 | M | xyz | 0.722 |
| Customer Churn Model v2 | xxxyyyzzz00000004 | TX | 30-40 | F | xyz | 0.694 |
| Customer Churn Model v2 | xxxyyyzzz00000005 | CA | 40-50 | M | xyz | 0.555 |
| Customer Churn Model v2 | ... | ... | ... | ... | ... | ... |
| Customer Churn Model v2 | xxxyyyzzz00000007 | CA | 40-50 | M | xyz | 0.334 |

FIG. 9B

| Model Project Name | | | | | | | |
|---|---|---|---|---|---|---|---|
| Product A Propensity | | | Description: Product A Propensity | | | | |
| Model | | | | | | | |
| Product Propensity Scikit Randomforest | | | | | | | |
| Model Name | | | | | | | |
| Product Propensity Scikit Randomforest | | | Description: Product Propensity Scikit Randomforest | | | | |
| Framework | | | Model Algorithm: Random Forest | | Deployment Type: QuickPath Hosted | | |
| sklearn 1.0 | | | | | | | |
| Version | | | | | | | |
| v44.0 | | | | | | | |

FEATURES  HYPERPARAMETERS  METRICS  PERFERENCE  OUTCOME

Argument Name: X

| Column | Data Type | Feature Type | Transformation | Default Value | Default Range | Actions |
|---|---|---|---|---|---|---|
| LoanID | integer | Continuous | None | | 0 – 1000000 | |
| Gender | string | Categorical | None | | {"Female": 0, "Male": 1} | |
| Married | string | Categorical | None | | {"No": 0, "Yes": 1} | |
| Dependents | integer | Nominal | None | | 0 – 3 | |
| Education | string | Categorical | None | | {"Not Graduate": 1, "Gr...} | |
| Self_Employed | string | Categorical | None | | {"No": 0, "Yes": 1} | |
| ApplicantIncome | float | Continuous | Scaling | | 1000 – 80000 | |
| CoapplicantIncome | float | Continuous | Scaling | | 0 – 33387 | |
| LoanAmount | float | Continuous | Scaling | | 1500 – 6000 | |

EDIT

ACTIONS

FIG. 16

Online Training Product A Propensity Model

| VERSION | TRAINING DATE | TRAINED BY | DECISION BLUEPRINTS | MODEL FRAMEWORK | FRAMEWORK VERSION |
|---|---|---|---|---|---|
| Training | 2018-01-11 | ML Engineer | Product Propensity H2O... | H2O | 3.20.0.7 |

Product A Propensity Online Model Versions

| VERSION | DEPLOYMENT DATE | DEPLOYED BY | DECISION BLUEPRINTS | MODEL FRAMEWORK | FRAMEWORK VERSION |
|---|---|---|---|---|---|
| V1 | 2018-03-05 | ML Engineer | Product Propensity H2... | H2O | 3.20.0.7 |
| V2 | 2018-06-05 | ML Engineer | Product Propensity H2... | H2O | 3.20.0.7 |

3.04M

H2O GBM Offline Training Metrics

FROM FIG. 18A

Features

| FEATURE | DATA TYPE | FEATURE TYPE | TRANSFORM | FEATURE IMPORTANT |
|---|---|---|---|---|
| Property | String | Categorical | Encode | 0.059153277576 |
| Gender | String | Categorical | Encode | 0.051216381937 |
| Dependents | String | Categorical | Encode | 0.040832921941 |
| Credit History | String | Categorical | Encode | 0.029134798564 |
| Education | String | Categorical | Encode | 0.017607785374 |
| Married | String | Categorical | Encode | 0.016277139293 |
| Coapplicant... | Float | Continuous | Scaling | -0.00025415192 |
| Self_Employed | String | Categorical | Encode | -0.000629652692 |
| Purchaser | Integer | Dependent Bi... | None | 0.000000000000 |

Hyperparameters

| HYPERPARAMETER | PARAMETER VALUE |
|---|---|
| nfolds | 0 |
| ntreest | 50 |
| distribution | bernoulli |
| Learn rate | 0.1 |

Features

| FEATURE | DATA TYPE | FEATURE TYPE |
|---|---|---|
| Property | String | Categorical |
| Gender | String | Categorical |
| Dependents | String | Categorical |
| Credit History | String | Categorical |
| Education | String | Categorical |
| Married | String | Categorical |
| Coapplicant... | Float | Continuous |
| Self_Employed | String | Categorical |
| Purchaser | Integer | Dependent Bi... |

Hyperparameters

| HYPERPARAMETER |
|---|
| nfolds |
| ntreest |
| distribution |
| Learn rate |

Features

| FEATURE | DATA TYPE | FEATURE TYPE | TRANSFORM | FEATURE IMPORTANT |
|---|---|---|---|---|
| Property | String | Categorical | Encode | 0.06004057673... |
| Gender | String | Categorical | Encode | 0.05189462766... |
| Dependents | String | Categorical | Encode | 0.04144541577... |
| Credit History | String | Categorical | Encode | 0.02957182054... |
| Education | String | Categorical | Encode | 0.01787190215... |
| Married | String | Categorical | Encode | 0.01652129638... |
| Coapplicant I... | Float | Continuous | Scaling | -0.00002541519... |
| Self_Employed | String | Categorical | Encode | -0.00639300053... |
| Purchaser | Integer | Dependent Bi... | None | 0.00000000000 |
| Categorical | | | Encode | 0.06092787590328 |
| Categorical | | | Encode | 0.05275287339511 |
| Categorical | | | Encode | 0.04205790959923 |
| Categorical | | | Encode | 0.03000084252092 |
| Categorical | | | Encode | 0.01813601893522 |
| Categorical | | | Encode | 0.01676545347179 |
| Continuous | | | Scaling | -0.00002541519... |
| Categorical | | | Encode | -0.00648747837... |
| Dependent Bi... | | | None | 0.00000000000 |

Hyperparameters

| HYPERPARAMETER | PARAMETER VALUE |
|---|---|
| criterion | gini |
| max_depth | Default |
| min_samples_split | 5 |
| max_features | auto |

| PARAMETER VALUE |
|---|
| 0 |
| 100 |
| bernoulli |
| 0.1 |

REAL-TIME DRIFT DETECTION IN MACHINE LEARNING SYSTEMS AND APPLICATIONS

CROSS-REFERENCE TO RELATED APPLICATIONS

This application is a continuation-in-part application to U.S. Non-Provisional patent application Ser. No. 16/396,605, filed Apr. 26, 2018 entitled "Model score recall for machine learning systems and applications," which claims priority to U.S. Provisional Patent Application Ser. No. 62/663,225, filed Apr. 26, 2018 entitled "Model score recall system for machine learning applications." This application also claims priority to U.S. Provisional Patent Application Ser. No. 62/727,760, filed Sep. 6, 2018 entitled "System and method of detecting drift in real-time machine learning and prediction environment." This application also claims priority to U.S. Provisional Patent Application Ser. No. 62/727,746, filed Sep. 6, 2018 entitled "System and method for detecting anomalies in prediction generation systems." The entire content of foregoing applications is incorporated herein by reference.

BACKGROUND

Field of the Art

This disclosure relates to systems and methods for improving machine learning systems and applications. More specifically, the present disclosure relates to systems and methods for detecting drift that leads to errors in a predictive analytics system.

Discussion of the State of the Art

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Machine learning/scoring systems that generate machine learned models, and score incoming data requests based on the learned models require significant computing resources and costs to deploy effectively. Often, because of the processing requirements, these systems are unable to make real-time or near real-time predictions. If the systems are enabled to make near real-time predictions, then the hardware and software deployment costs are often significant.

Cloud scoring APIs, such as Amazon's AWS®, or Microsoft's Azure® also present significant costs when dealing with a large number of incoming scoring requests. Cloud scoring APIs typically bill users for using their machine learning systems, the computing time required to build a machine learned model, and a prediction fee for each subsequent prediction that is made by the system using the machine learned model. The prediction fee includes charges for batch predictions as well as real-time predictions, and may also include additional charges for storing the model during the prediction phase. Prediction fees for cloud scoring APIs can often cost as much as a penny per prediction, and represent a significant cost burden when a large number of predictions are required.

Machine learning systems and predictive analytics tend to run into issues related to "dataset drift" when deployed in real-world applications. "Dataset drift" occurs when machine learning models are passed new inputs that include new values or skew in data that is no longer representative of the distribution of data in the offline training dataset, or which are not present in training datasets, or new data that is not representative of the training data. This may occur because of a sample selection bias, or because of non-stationary environments wherein the data changes because of a variety of factors, including but not limited to, instances where an adversary tries to work around the existing classifier's learned concepts, or where new data is simply not representative of training data. In other instances, drifts may occur, for example, because of changes in population distribution over time, changes in distribution of a class variable, or changes to definitions of a class, i.e. a changing context that can induce changes in target concepts.

Data scientists have been trying to account for, recognize, debug, and determine the mitigation strategy for various types of drift by using a variety of different methodologies. In one instance, machine learning systems have adopted classifiers that can be updated incrementally with new data. But this methodology raises new concerns about whether a learning system can be designed to remain stable and remain immune to irrelevant events (e.g., outliers), while being adaptive to new, important data (e.g., changes in concepts). Others have tried to solve the problem algorithmically by, for example, using the log likelihood function, importance-weighted cross-validation, asymptotic Bayesian generalization error, discriminative learning, kernel mean matching, or adversarial search. Other approaches include determining the existence and/or shape of dataset shift between two datasets.

But none of these approaches help identify dataset drifts in real-time, non-stationary environments. Currently, no validation or verification is performed at all, and any drifts that may occur often goes unnoticed. Some systems require manual comparisons of offline data/scoring to online data/scoring, but those comparisons tend to be very tedious, and require highly complex debugging and troubleshooting to determine if even a problem exists. Significant additional resources may be required to pinpoint the root cause of the drift. The business costs and risks associated with current systems are significant, and the technical difficulties with doing so are overwhelming.

Machine learning systems and predictive analytics, when deployed in real-world applications, tend to run into issues related to anomalies. Anomalies may exist, for example, in new, incoming data that must be classified, in predictions made on new, incoming data, and in outcomes obtained by the predictive analytics system. Generally, data anomalies include, but are not limited to, existing skew in variable distribution (training vs. scoring), out of bounds for continuous variables, new value for categorical variable, null or blank model input values, recognizing blacklisted words to prevent bias ML models (for NLP/NLU), and ML input threat detection. Prediction anomalies include, but are not limited to, prediction volumes over time, prediction volume distribution changes (e.g. scores move up or down), and null or zero score predictions. Outcome anomalies include, but are not limited to, outcome volume distribution changes (e.g.: training vs scoring), and outcome in relation to prediction volume distribution changes (e.g.: low prediction scores are outperforming high prediction scores).

The various types of anomalies degrade the performance of the machine learning or predictive analytics systems over time. In some instances, anomalies may lead to prediction errors and/or unintended outcomes. For example, if the training data set contains names of states in the United States, and if an incoming scoring request includes a name of a state outside of the United States, then the classifier may return a void, null, negative or incorrect result for the incoming scoring request.

Anomalies are also extremely difficult to detect in real-time. For example, it may be easy to detect anomalies once sufficient number of requests have been scored. But this backward-looking approach is not useful in evaluating the performance of the system in real-time. Moreover, the backward looking approaches are not very useful in identifying classification errors or performance degradation quickly enough to prevent classification and outcome errors.

None of these approaches help identify anomalies in real-time, non-stationary environments. Currently, no validation or verification is performed at all, and any anomalies that may occur often goes unnoticed. Some systems require manual comparisons of offline data/scoring to online data/scoring, but those comparisons tend to be very tedious, and require highly complex debugging and troubleshooting to determine if even a problem exists. Moreover, significant additional resources may be required to pinpoint the root cause of the variance and/or anomalies. The business costs and risks associated with current systems are significant, and the technical difficulties with doing so are overwhelming.

SUMMARY

The inventive system and method (hereinafter sometimes referred to more simply as "system" or "method") described herein is for detecting drift in a machine learning or a predictive analytics system in real-time or near real-time. The inventive system detects drift by bridging the offline training system and an online scoring system.

It is not trivial to connect an offline training environment with an online scoring environment. For example, offline training environments are usually static and contain large amounts of historical data which is needed for the initial training of models. Once trained, the model algorithms (just a calculation, no longer containing any data) are then migrated into an online scoring environment for transactional or event based scoring. This migration effectively breaks the connection between the data in the offline environment and the model now running in the online environment. When new or shifting data occurs in the online environment, the static model running in the online environment goes unaltered to the changing inputs. Current systems do not provide any connection between the offline training and validation datasets and the live data in online scoring.

However, once the offline and online environments are connected, the inventive system is enabled to detect drift in real-time or near real-time. The connected systems identify or detect performance degradation (caused by drift) in an "online" operational scoring environment. Specifically, the inventive system identifies degradation by establishing a baseline in an "online" operational scoring environment of trained and validated modeling dataset and scores, and by ensuring that new online data and scores match those that were established in the "offline" discovery environment when the model was trained.

The inventive system and method (hereinafter sometimes referred to more simply as "system" or "method") described herein is for detecting anomalies in a machine learning or a predictive analytics system in real-time or near real-time. The inventive system detects anomalies by bridging the offline training system and an online scoring system.

As stated above, is not trivial to connect an offline training environment with an online scoring environment. For example, offline training environments are usually static and contain large amounts of historical data that is needed for the initial training of models. Once trained, the model algorithms (just a calculation, no longer containing any data) are then migrated into an online scoring environment for transactional or event based scoring. This migration effectively breaks the connection between the data in the offline environment and the model now running in the online environment. When new or shifting data occurs in the online environment, the static model running in the online environment goes unaltered to the changing inputs. Current systems do not provide any connection between the offline training and validation datasets and the live data in online scoring.

Once the offline and online environments are connected, the inventive system is enabled to detect anomalies in real-time or near real-time. Specifically, the inventive system disclosed herein may be used to detect data anomalies, prediction anomalies, and outcome anomalies. More specifically, in order to detect anomalies in the incoming scoring data, the inventive system and method performs, for example and without limitation, domain checks for categorical variable, and detects out of bound values for continuous variables, variable value combinations, etc. In order to detect anomalies in the scores themselves, the inventive system and method identifies, for example and without limitation, thresholds, ranges, null/0 scores, and drifts, etc. in model scores, and compares them to historical trends. In order to detect outcome anomalies, the inventive system and method detects, for example and without limitation, outcome in relation to prediction volume distribution changes (e.g.: low prediction scores are outperforming high prediction scores). Through the various embodiment and examples described herein, the inventive system detects anomalies in real-time or near real-time, while improving the prediction accuracy for a system that traditionally detects these anomalies too late, if at all.

The present invention is for a computer program product for detecting whether an online, real-time machine learning system is degrading, the computer program product comprising a non-transitory computer readable storage medium having instructions encoded thereon that, when executed by a processor, cause the processor to score incoming scoring requests, wherein incoming scoring requests are scored by a machine learning model that is trained by using training dataset, receive batch scores assigned to the training dataset, determine whether the scored requests should be compared to the entries in the batch scored training dataset, determine whether a drift exists between the scored requests and the training dataset based on distribution of scored requests relative to the batch scores in the training dataset, determine whether the drift is statistically significant, and generate a notification if drift is determined to be statistically significant.

In one embodiment, the process for determining whether drift exists is comprised of identifying the percentage of records in the incoming scoring requests and the offline training dataset that are based on a variable, calculating a difference in the two percentages, calculating the natural log of percentages of records that are based on the variable in the incoming scoring requests and offline training dataset, and combine the calculated differences in the two percentages and the calculated natural logs.

In one embodiment, detecting whether drift is statistically significant is comprised of determining whether the combined result is above a threshold, and/or based on model prediction and score distributions, model variable profiling statistics, time window comparison and rate of change, model variable predictive power and/or relative importance, and/or risk factor associated with the identified drift.

In one embodiment, determining whether the scored requests should be compared to the entries in the batch scored training dataset is comprised of determining whether the scored comparison window is equivalent to the training window. A configurable analysis time window may be used to compared the batch scored training dataset with the scored data, wherein the configurable analysis time window represents the amount of time that is evaluated when comparing the real time events to the historical baseline to determine if drift is occurring. The configurable time window for comparison is established based on variance tolerance, velocity and/or volume of data, anticipated rate of change of input data, risk associated with drift occurring, and/or immediacy of remediation.

The present invention is for a computer program product for detecting anomalous activity in online, real-time machine learning environments, the computer program product comprising a non-transitory computer readable storage medium having instructions encoded thereon that, when executed by a processor, cause the processor to monitor an online scoring environment, wherein the online scoring environment is comprised of machine learning models for scoring incoming requests, the incoming requests being received and thereafter scored by using model learning models, and wherein outcome actions are initiated based on the score received by each incoming request, perform statistical analysis on incoming scoring requests to determine whether incoming scoring requests are anomalous, determine whether the scores output in the online scoring environment are anomalous, wherein the determination is performed by checking whether null/O scores are output in the online scoring environment, comparing the output scores against thresholds and historical trends that were established when the model algorithms were trained and/or validated, determine whether the outcome actions are anomalous, wherein the determination is performed by determining whether there is a drift between received scores and outcome actions, tag the anomalous activity with a flag, the flag comprising information about the type of anomaly that is detected, and generate an alert if an anomaly is detected in the incoming scoring requests, the scores output, or the outcome actions.

In one embodiment, performing statistical analysis on the incoming scoring request is comprised of performing domain checks for categorical variables in the incoming scoring requests and/or detecting out of bound values for continuous variables in the incoming scoring requests. In one embodiment, performing statistical analysis on the incoming scoring request is comprised of detecting out of bound values in a combination of values in the incoming scoring requests. In one embodiment, performing statistical analysis on the incoming scoring request is comprised of detecting unexpected values in a combination of values in the incoming scoring requests. In one embodiment, a machine learning model is applied to the incoming scoring requests to determine if unexpected values are present in a combination of values in the incoming scoring requests.

The present invention is for a computer program product comprising a non-transitory computer readable storage medium having instructions encoded thereon that, when executed by a processor, cause the processor to receive a scored dataset, wherein the scored dataset is a training dataset that has been scored by a machine learning model, the scored dataset comprising scores associated with input rows of cross features value within the dataset, flag certain features within the scored dataset, the flagged features being identified as having low relevance to the scores provided by the machine learning model, convert certain feature values within the scored dataset, the converted feature values identified as input row of cross feature values that have a high likelihood of receiving similar scores from the machine learning model, compress the received scored dataset, the compressed scored dataset comprising features that have been flagged as having low relevance to scores provided by the machine learning model, and comprising converted feature values, receive new scoring request, prepare the new scoring request, determine whether the prepared new scoring request matches an input row of cross feature values in the compressed scored dataset, retrieve score associated with a matching input row of cross feature values in the compressed scored dataset if a match is determined between the prepared new scoring request and an input row of cross feature values in the compressed scored dataset, pass the new scoring request to a scoring system if the prepared new scoring request does not match an input row of cross feature values in the compressed dataset, and obtain a new score provided by the scoring system for a new scoring request that does not match an input row of cross features values in the compressed dataset, and determine whether to store the new scoring request and the obtained new score as an input row of cross feature values in the compressed dataset.

The present inventions is also for a computer-implemented method comprising, receiving a scored dataset, wherein the scored dataset is a training dataset that has been scored by a machine learning model, the scored dataset comprising scores associated with input rows of cross features value within the dataset, flagging certain features within the scored dataset, the flagged features being identified as having low relevance to the scores provided by the machine learning model, converting certain feature values within the scored dataset, the converted feature values identified as feature values that have a high likelihood of receiving similar scores from the machine learning model, compressing the received scored dataset, the compressed scored dataset comprising features that have been flagged as having low relevance to scores provided by the machine learning model, and comprising converted feature values, receiving new scoring request, preparing the new scoring request, determining whether the prepared new scoring request matches an input row of cross feature values in the compressed scored dataset, retrieving a score associated with a matching input row of cross feature values in the compressed scored dataset if a match is determined between the prepared new scoring request and an input row of cross feature values in the compressed scored dataset, pass the new scoring request to a scoring system if the prepared new scoring request does not match an input row of cross feature values in the compressed dataset, and obtaining a new score provided by the scoring system for a new scoring request that does not match an input row of cross features values in the compressed dataset, and determine whether to store the new scoring request and the obtained new score as an input row of cross feature values in the compressed dataset.

In one embodiment, flagging certain features as having low relevance to scores provided by the machine learning model is further comprised of identifying feature values that are unique throughout a feature within the scored dataset.

Identifying unique feature values is further comprised of identifying feature values that have been partially redacted for privacy or security purposes. The converting step may be further comprised of converting numerical feature values into categorical feature values. A binning, scaling, and/or imputation methodology may be used to covert feature values that have a high likelihood of receiving similar scores from the machine learning model.

In one embodiment of the invention, a cryptographic hash function may be applied to compress input rows of cross feature values within the received scored dataset. In one embodiment, a checksum function may be applied to compress input rows of cross feature values within the received scored dataset.

In one embodiment of the invention, the new scoring requests may be received from a data intercept system. More particularly, the new scoring requests are received in near real-time to enable the claimed computer-implemented method to process the new scoring request, match the processing scoring request to input rows of cross feature values in the compressed dataset, and retrieve a matching score if a match is detected in near real-time.

In one embodiment of the invention, preparing the new scoring request is further comprised of converting numerical feature values into categorical feature values. Determining whether the prepared new scoring request matches an input row of cross feature values in the compressed scored dataset may be further comprised of compressing the prepared new scoring request. A hash function is applied to obtain the compressed scored dataset and the compressed prepared new scoring request. A match between the compressed prepared new scoring request and an input row of cross feature values in the compressed scored dataset is determined if the hash value associated with the compressed prepared new scoring request is the same as the hash value associated with an input row of cross feature values in the compressed scored dataset. The match detection methodology enabling near real-time matching between compressed prepared new scoring requests and input rows of cross feature values in the compressed scored dataset.

In one embodiment of the invention, the compressed prepared new scoring request and the score provided by a scoring system are compressed and stored as input row of cross feature values within the compressed scored database. The invention may be further comprised of identifying how a score was obtained for a new scoring request and/or destroying the compressed scored database if the machine learning model is updated.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIG. 9A illustrates an exemplary dataset that may be processed in accordance with an exemplary embodiment of the invention.

FIG. 9B illustrates an exemplary dataset that has been compressed in accordance with an exemplary embodiment of the invention.

FIG. 16 illustrates an exemplary graphical user interface displaying the pre-caching analysis that may be applied to incoming scoring requests in accordance with an embodiment of the invention.

FIGS. 18A-18J illustrate an exemplary graphical user interface displaying anomaly data lineage in accordance with an embodiment of the invention.

DETAILED DESCRIPTION

Figure 1:
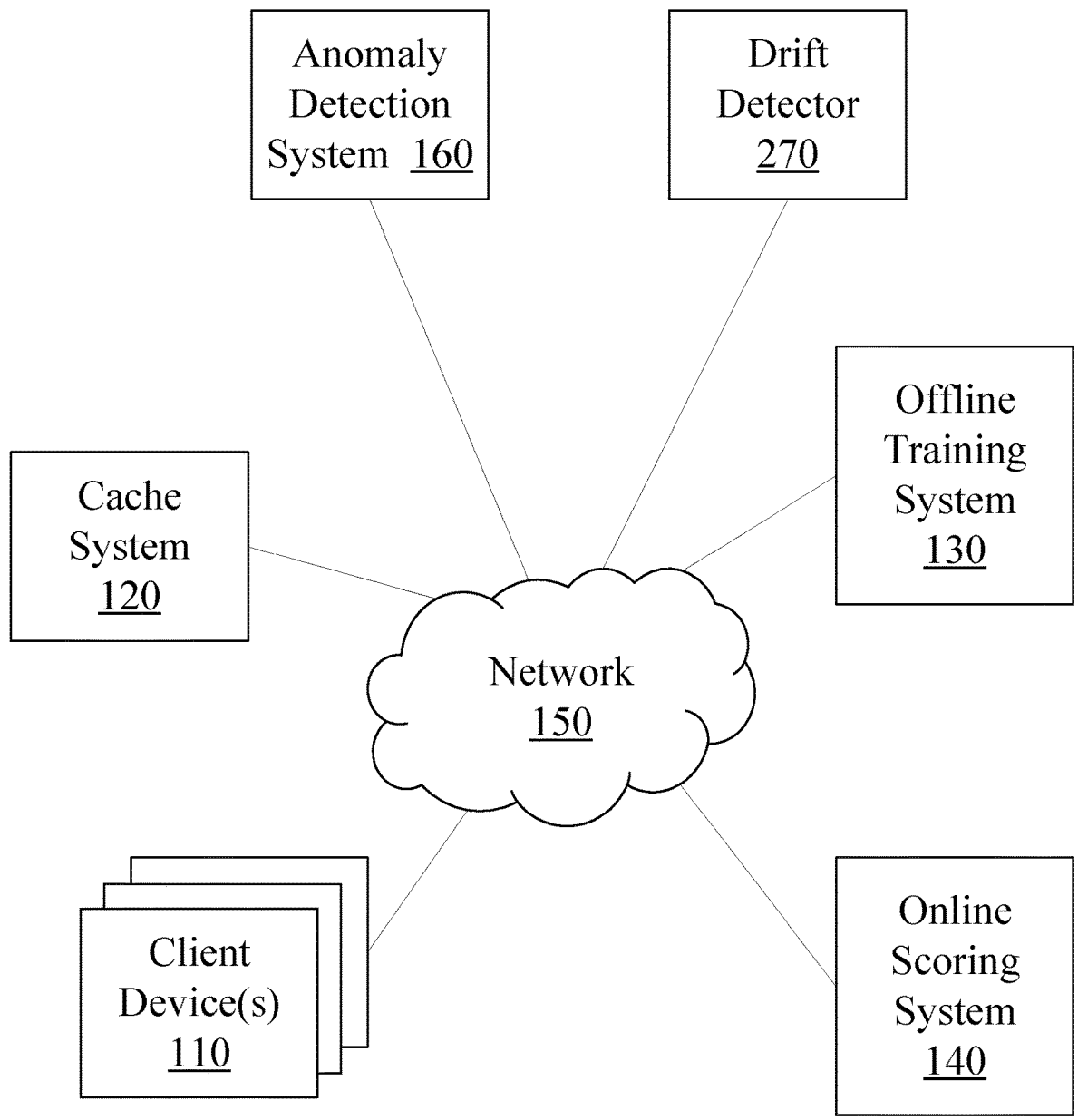
FIG. 1 illustrates various elements of an exemplary model score recall system, according to one embodiment.

The inventive system and method (hereinafter sometimes referred to more simply as "system" or "method") described herein significantly reduces the computing resources, computing time, and costs associated with making predictions in a deployed machine learning system, regardless of whether the predictions are made using a deployed system or a cloud scoring API. Specifically, the inventive system stores certain predictions once they are made, processes the stored data, and uses stored predictions if newly requested predictions meet certain similarity criteria associated with the stored predictions. The inventive system described herein reduces the computing resources, computing time, and costs cost associated with making predictions in a dedicated, or shared/rented machine learning system environment.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

Conceptual Architecture

FIG. 1 illustrates an exemplary embodiment of a model score recall system according to one embodiment. The system includes an offline training system 130, an online scoring system 140, client device(s) 110, database(s) 125, a cache system 120, and a network 150 over which the various systems communicate and interact. The various computing devices described herein are exemplary and for illustration purposes only. The system may be reorganized or consolidated, as understood by a person of ordinary skill in the art, to perform the same tasks on one or more other servers or computing devices without departing from the scope of the invention.

The offline training system 130 trains a machine learning model from "offline" training data. Specifically, the offline training system 130 trains a model by batch processing the training data. The offline training system 130 is described in greater detail in FIG. 2A, but in general, the offline training system 130 may use any "offline" learning algorithm that may be known to a person of ordinary skill in the art without departing from the scope of the invention, including, large-scale distributed training of decision trees, linear and logistic models, unsupervised models (k-means), time series models, deep neural networks, etc. The offline training system 130 may include a model configurator for configuring the training job. It may specify model type, hyper-parameters, data source reference, and feature DSL expressions, as well as compute resource requirements (the number of machines, how much memory, whether or not to use GPUs, etc.). The offline training system 130 may also include a performance evaluator, which may evaluate the model based on any number of evaluation methodologies that are known to a person of ordinary skill in the art, including, but not limited to ROC curve and PR curve, etc.

The online scoring system 140 makes predictions based on the models that are trained by the offline training system 130, and data that is fed to the online scoring system 140. The specific features of the online scoring system 140 are described in greater detail in FIG. 2B. But generally, the online scoring system 140 batch scores the training data and generates a baseline that measures the difference in performance between the offline training model generated by the offline training system 130, and the scores generated by the online scoring system 140. Once a baseline is established, it is constantly updated based on new predictions or classifications made by the online scoring system 140. The online scoring system 140 also measures drift between the models created by the offline training system 130 and the predictions made by the online scoring system 140. As mentioned above, and described in more detail below, the predictions or classifications made by the online scoring system 140 drifts over time as the system is presented with new data that has different values, distribution, or patterns than the training data. The inventive online scoring system 140 measures this drift in near real-time as predictions or classifications are made on new incoming scoring request data. If the detected drift rises above a predetermined level, automatic or manual intervention may be recommended, as described in greater detail below. In this manner, the system is enabled to detect performance degradation of the online scoring system 140 in an operational scoring environment.

The database(s) 125 may include databases for storing data, storing features, storing outcomes (training sets), and storing models. Other databases may be added or subtracted, as would be readily understood by a person of ordinary skill in the art, without departing from the scope of the invention.

The anomaly detection system 160 identifies anomalies by identifying certain patterns in input data, and/or by model scores that are output for each incoming scoring request. In order to detect anomalies in the data, the anomaly detection system 160 may perform domain checks for categorical variables, and may detect out of bound values for continuous variables. In order to detect anomalies in the scores themselves, the anomaly detection system 160 may check thresholds, ranges, null/0 scores, and drifts in scores output by the online scoring system 140, and compare them to historical trends to detect score anomalies in real-time or near real-time.

The cache 120 stores predictions made by the batch scoring system/the offline training system 130, and the real-time predictions made by the online scoring system 140. Moreover, the cache 120 stores categories and category values associated with each prediction, such that, if a new request is made with the same categories and/or category values the predictions that are already stored in the cache may be used without having to make new prediction requests. In one embodiment, the cache 120 prepares categories and/or category values associated with certain categories and/or category values to ensure that two incoming scoring requests that are sufficiently close to each other—i.e. requests that will receive the same prediction score or classification—are recognized as such (i.e. that sufficiently close score requests are not treated as unique requests). Moreover, the cache also excludes certain categories and/or category values that tend to be unique to each scoring request and/or tend to not have any impact on the prediction scores. The filtering/exclusion system ensures that incoming scoring requests that are sufficiently close to cached requests receive a prediction score from the cache.

Client device(s) 110 include, generally, a computer or computing device including functionality for communicating (e.g., remotely) over a network 150. Data may be collected from client devices 110, and data requests may be initiated from each client device 110. Client device(s) 110 may be a server, a desktop computer, a laptop computer, personal digital assistant (PDA), an in- or out-of-car navigation system, a smart phone or other cellular or mobile phone, or mobile gaming device, among other suitable computing devices. Client devices 110 may execute one or more client applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 110. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 110 one or more Hyper Text Markup Language (HTML) files responsive to the HTTP request. The user device 110 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application 110 obtains data from the network 110 and displays it to the user within the application 533 interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various clients devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Offline Training System and Online Scoring System

Figure 2A:
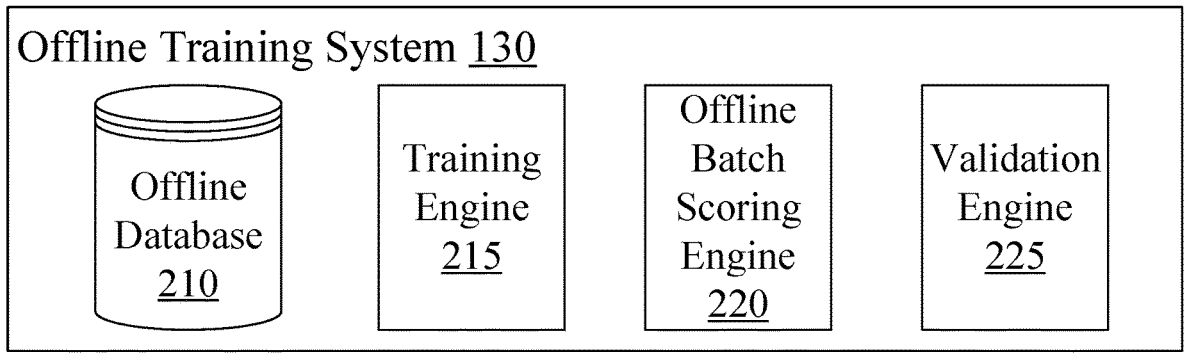
FIG. 2A illustrates the offline training system of the presently disclosed machine learning system that utilizes online and offline processing associated with the model score recall system, according to one embodiment.

FIG. 2A illustrates an exemplary embodiment of the offline training system 130. The offline training system 130 generates machine learning models based on training data, wherein the models may be used score or classify incoming requests. The offline training system 130 includes an offline database 210, a training engine 215, and offline batch scoring engine 220, and a validation engine 225. Other system and databases may be used, as would be readily understood by a person of ordinary skill in the art, without departing from the scope of the invention The offline database 210 stores one or more datasets for use in an offline machine learning training environment. The offline database 210 is illustrated within the offline training system 130 for illustration purposes. It may reside inside or outside the offline training system 130, as would be readily understood to a person of ordinary skill in the art. Exemplary databases 210 include a database for storing data, a database for storing features, a database for storing outcomes or training sets, a database for storing models. Other databases may be used, as would be readily understood to a person of ordinary skill in the art, without departing from the scope of the invention.

The training engine 215 generates machine learned models from training datasets. As would be readily understood by a person of ordinary skill in the art, any suitable training methodology may be used without departing from the scope of the invention. Exemplary training methodologies include, but are not limited to, distributed training of decision trees, linear and logistic models, unsupervised models, time series models, deep networks, etc.

In the offline batch scoring engine 220 scores test data based on the models that are generated by the training engine 215. Batch scoring refers to a type of processing where an entire data set or large portion of the data set is processed through a single or recurring job. In the off-line batch scoring engine 220 may use any system that would be readily apparent to a person of ordinary skill in the art for the purposes of scoring a training data set in an off-line machine learning environment.

The validation engine 225 validates the dataset scored by the off-line batch scoring engine 220. The validation may perform a variety of different functions, including determining how well the model has been trained, and to estimate model properties, such as mesne error for numeric predictors classification errors for classifiers recall and precision for IR models, etc. A variety of different validation methodologies may be used, as would be readily understood to a person of ordinary skill in the art, without departing from the scope of the invention.

Figure 2B:
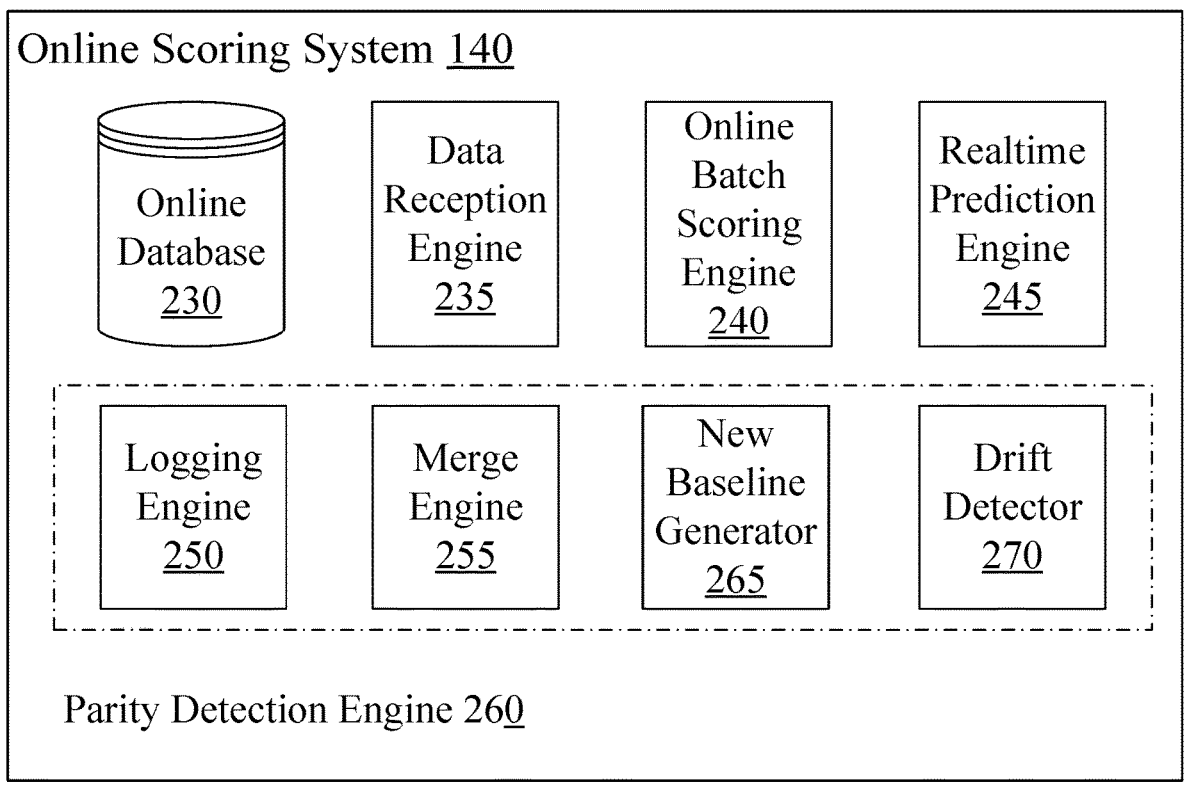
FIG. 2B illustrates the online scoring system of the presently disclosed machine learning system that utilizes online and offline processing associated with the model score recall system, according to one embodiment.

FIG. 2B illustrates an online scoring system 140, which scores incoming scoring requests, and establishes the baseline for detecting performance degradation. The online scoring system 140 comprises of an online database 230, a data reception engine 235, an online batch scoring engine 240, a real-time prediction engine 245, a logging engine 250, a merge engine 255, a parity detection engine 260, which includes a new baseline generator 265, and a drift detector 270.

The online database 230 refers to a variety of databases that may be used to make near real-time predictions in an online environment. The online database 230 may include, for example, a feature store database, wherein some of the features needed for near real-time compute may be precomputed and stored. Other databases 230 may include a database of metrics, which may be used to generate aggregate features, and databases for storing incoming scoring requests. The specific number and types of databases 230 may vary depending on the type of machine learning implementation model that is deployed, as would be readily understood by a person of ordinary skill in the art.

The data reception engine 235, and the real-time prediction engine 245 make predictions for incoming scoring request data. The data reception engine 235 processes incoming scoring requests by parsing the scoring requests, and collecting real time data inputs that may be necessary to score the requests. The real-time prediction engine 245 makes predictions based on the model that is generated by the offline training system 130, and the data processed by the data reception engine 235.

The parity detection engine 260 includes a logging engine 250, a merge engine 255, a baseline generator 265, and a drift detector. The parity detection engine 260 measures the performance degradation of the online scoring system 140 against the model generated by the offline training system 130. The specific mechanism for doing this is discussed in greater detail in FIG. 3, but the various subsystem used to complete this process are described in reference to FIG. 2B.

The logging engine 250 logs batch scores and newly scored online scores. In one embodiment, the logging engine 250 obtains batch scores from the online batch scoring engine 240, which batch scores the offline training dataset that is used by the offline training system 130. In one embodiment, the logging engine logs the online batch scores as "baseline" model scores. The logging engine 250 also obtains newly scored data from the online scoring system 140, and logs newly scored online scores as "test" results. In one embodiment, logging is performed using asynchronous log/event messaging such as Kafka, MQ, or asynchronous direct database inserts.

The merge engine 255 merges offline "baseline" model scores with online "test" scores that are logged by the logging engine 250. In one embodiment, the merge engine 225 uses a combination of cached results for inline anomaly detection and logged results that are comparable in a real time reporting and monitoring solution like the ELK stack.

The drift detector 270, herein also referred to as the deviation analysis engine 270, measures the deviation between the offline "baseline" model and the online "test" model, as presented in the merged results generated by the merge engine 255. The drift detector 270 may use a variety of methods for identifying a drift or a deviation in the merged results. A few specific methodologies are detecting deviations are described in reference to FIG. 3 and FIG. 4, however, other methodologies may be used, as would be readily understood by a person of ordinary skill in the art, without departing from the scope of the invention.

The new baseline generator 265 generates new baselines whenever a model is retrained based on more current, enriched data containing new features. The new baseline generator 265 uses a new version of the trained baseline dataset that would be used from that point forward.

Cache System

Figure 3:
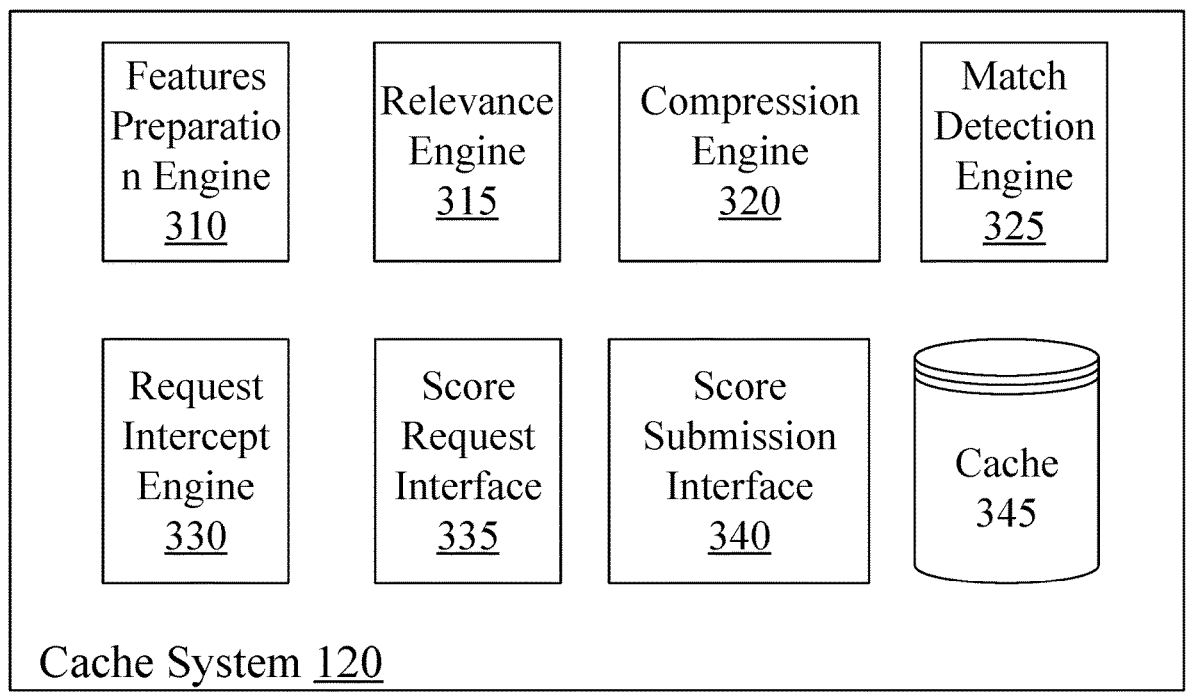
FIG. 3 illustrates components of a model score recall system, according to one embodiment.

FIG. 3 illustrates an exemplary cache system for storing and re-routing incoming scoring requests, in accordance with one embodiment of the invention. The system includes a features preparation engine 310, a relevance engine 315, a compression engine 320, a match detection engine 325, a request intercept engine 330, a score request interface 335, a score submission interface 340, and a cache database 345.

The features preparation engine 310 prepares features in incoming scoring requests to identify scoring requests whose scores have already been predicted, either during batch processing or real-time processing. The features preparation engine 310 may use a variety of different methods to do so, including, without limitation, binning, scaling, imputation, etc. In one embodiment, the features preparation engine 310 converts numerical data associated with each relevant feature value into categorical data. For example, the features preparation engine 310 may convert specific age data associated with scoring requests into buckets or categories with age ranges. A scoring request wherein the age data is 22 may be categorized, for example, into an age range of 21-25. Similarly, the data associated with the number of visits feature may be categorized from a specific feature value of 135 into a feature value of 101-150. The specific determination of which features and/or feature values to prepare varies. Typically, the determination is based on an identification of features and/or feature values that are likely to receive the same prediction score from a machine learned model. The methodologies for identifying features and/or feature values to prepare would be understood by a person of ordinary skill in the art, and are not described in greater detail herein.

FIG. 9A illustrates an exemplary dataset that has been scored by a machine learning model. Is illustrated in FIG. 9A, the dataset may be comprised of the following features: a model name, customer ID, state, age-band, gender, var N, and score. The specific values within each feature is referred to herein, and throughout the specification as feature values. A row may be referred to as an input row of cross feature values. The dataset also illustrates at least one feature values that has been prepared by the features preparation engine 310. For example, the "age band" column represents feature values that have been converted from a specific number (a first feature value) into a category (a second feature value) comprising a range of numbers. As discussed in further detail below, some of the feature values, such as "customer ID" may be marked as being irrelevant by the relevance engine 315.

The relevance engine 315 identifies and/or flags features and/or feature values that are unlikely to have any relevance on prediction scores. Features that are irrelevant from a scoring perspective typically include, but not limited to, a user's unique identification information, such as social security number, email address, etc. The relevance engine 315 also identifies other features and/or feature values that have a low likelihood of relevance (i.e. should not be used because it causes classification errors, or simply has little to no bearing on classification) to the score obtained from the machine learning model. In one embodiment, the model metadata may store feature importance value. Features with a low or a certain importance value may be identified by the relevance engine 315 as having a low likelihood of relevance in terms of obtaining a score from a machine learning model. In this embodiment, feature importance value need not be zero. Very low values, or values at or around a predetermined threshold may be used as an indication identifying a feature with low likelihood of being relevant to the scores obtained from a machine learning model. These flagged features and/or feature values may be ignored when determining if a prediction score already exists in the cache 120.

The compression engine 320 compresses the data that is cached and incoming scoring request data in order to improve the speed and accuracy of the process for determining if a scoring request has already been scored and stored in cache 120. In one embodiment, the compression engine 320 uses a cryptographic hash function, or a cryptographic hash value to determine if an incoming scoring request is the same as a scoring request that is scored and stored in the cache 120. A variety of different cryptographic hash algorithms may be applied, including, but not limited to MD5, SHA-1, etc. In one exemplary embodiment, an image pointer (i.e. a content management system URL) may be used for MD5 caching location to determine if an image is in cache. If it is, then the cached value may be returned. Cryptographic hash functions are one exemplary method of applying compression to enable faster comparison, but, as would be readily understood by a person of ordinary skill in the art, other methodologies may be applied without departing from the scope of the invention.

FIG. 9B illustrates input rows of cross feature values within a dataset that have been compressed by the compression engine 320. In comparison to the table illustrated in FIG. 9A, certain features and/or feature values may be marked as low relevance, such as, in this particular example, the "customer ID" values. Moreover, the value obtained as a result of applying compression are also illustrated. In this case, the compression values are illustrated as "Variable Combination Checksum" in FIG. 9B. These values may be used to determine if there is a match between a new scoring request and an entry that has already been scored and compressed in a dataset. In one embodiment of the invention, once the entries have been compressed via a checksum and/or cryptographic hash function, they may be compressed further by grouping the entries by unique combination of entries or features. This additional step enables the system and the process to identify matches much more quickly. For example, the grouping function may compress a dataset of million entries into a hundred thousand entries. The matching process, which is described elsewhere in this disclosure, may performing a matching function on only the hundred thousand entries, in this particular example, thereby saving compute resources and speeding up the matching and retrieval process.

The match detection engine 325 determines if an incoming scoring request query matches a input row of cross feature values that is already scored and stored in the cache 120. In an embodiment wherein a cryptographic hash function is used to compress the query, the match detection engine 325 compares the hash values of the incoming request query with entries that have already been scored. If there is a perfect match between two hash values, then the match detection engine 325 retrieves the score associated with the matching query. The cached score is thereafter used to complete the online scoring process described above in reference to FIG. 2.

The request intercept engine 330, score request interface 335, and the score submission interface 340 interact with the machine learning scoring systems. The request intercept engine 330 intercepts scoring requests from being passed to the machine learned scoring systems, which typically charge users for calculating a score. The intercepted scoring request is then passed to the compression 320 and match detecting engine 325 to determine if the incoming scoring request has already been scored and stored in the cache 120. If it has not been scored, then the score request interface 335 passes the incoming search request to the machine learning systems to obtain a paid score. Once a paid score is obtained, the score submission interface 340 submits the scoring request and the score to the features preparation engine 310, relevance engine 315, and compression engine 320 for processing and storage.

The cache 345 is an exemplary database wherein compressed scored requests along with their scores are stored. In an embodiment wherein cryptographic hash functions are used, the cache 345 specifically stores the hash value and the score associated with the hash value. Although the cache 345 is illustrated as being within the cache system 120, the cache database(s) 345 may be anywhere and may be accessed by a network interface, as would be readily understood by a person of ordinary skill in the art. Moreover, even though the cache 345 is illustrated as one database, the storage functionality described herein may be implemented across various databases spread out over various locations. The database 345 described herein may be implemented in a number of way, as would be apparent to a person of ordinary skill in the art, without departing from the scope of the invention.

Processes for Recalling Model Scores

Figure 4:
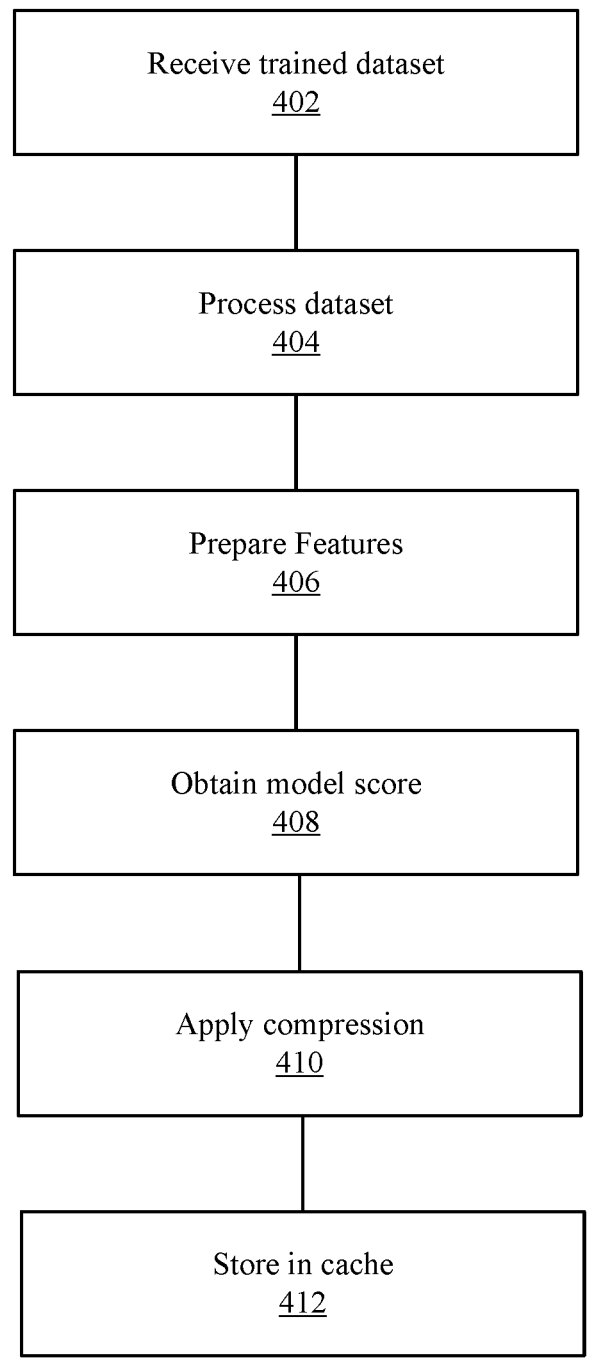
FIG. 4 illustrates a flowchart of an exemplary process for storing model scores, according to one embodiment.

FIG. 4 illustrates an exemplary process for storing scores for queries that have already been scored. The process starts by obtaining a trained dataset 402. The trained data set may be batch scored and may be obtained from the offline training system 130 or the online scoring system 140.

Thereafter, the dataset is processed 404 for features and/or feature values that would not affect the scores. Exemplary features include, but are not limited to, user identifiers such as email, social security numbers, customer IDs, etc. Other features may be used, as would be readily understood by a person of ordinary skill, without departing from the scope of the invention. The features that tend to be unique and/or not impact the scores are, in this manner, ignored by the subsequent compression and match detection steps. The process thereby ensures that otherwise matching scoring queries are not rejected because of unique but ultimately irrelevant data associated with each query.

Data associated with features may also be prepared 406 into categories to ensure that sufficient number of matches are identified by the model score recall process. A number of different preparation methodologies may be used without departing from the scope of the invention, including, but not limited to, binning, scaling (e.g., for high cardinality items), imputation (e.g., for null and/or missing values), normalization, etc. In one exemplary embodiment, features such as age, date of birth, etc. may, for example, be binned in category ranges such as 21-30, etc. The binning process ensures that these types of feature values are banded in similar categories to increase the number of matches during the match process, and reduce the number of paid scores that are obtained from a machine learning system. In one embodiment, features that have a high variance, and some minimal impact on the scores, may be binned in one category wherein the values in the category affect the score similarly. The methodologies to bin feature values would be readily understood by a person of ordinary skill in the art; any of which may be used without departing from the scope of the invention.

Once the training dataset is processed, the process obtains model scores 408 and applies compression to the training dataset. As described above, the model scores may be obtained from the offline training system 130 or the online scoring system 140. In one embodiment, the process applies a checksum or cryptographic hash function 410 to each entry in the processed training data. The cryptographic hash function not only compresses each entry in the training data, but also provides a key or a string of characters that represents each data point for each input rows of cross feature values. A variety of different cryptographic hash functions may be used, which may be known to a person of ordinary skill in the art, including, but not limited to MD5, SHA-1, CRC32, etc. In one embodiment of the invention, once the entries have been compressed via a checksum and/or cryptographic hash function, may be compressed further by grouping the entries by unique combination of entries or features. This additional step enables the system and the process to identify matches much more quickly. For example, the grouping function may compress a dataset of million entries into a hundred thousand entries. The matching process, which is described elsewhere in this disclosure, may performing a matching function on only the hundred thousand entries, in this particular example, thereby saving compute resources and speeding up the matching and retrieval process.

Each entry from the training dataset that has been compressed is thereafter stored 412 in a cache along with the score received by each respective entry. The data stored in the cache may be quickly accessible to enable lookup functions. If an incoming scoring request has a checksum value that matches a stored entry's checksum value, then the score associated with the stored entry may also be applied to the incoming scoring request without having to perform a compute operation on a machine learning system server.

Figure 5:
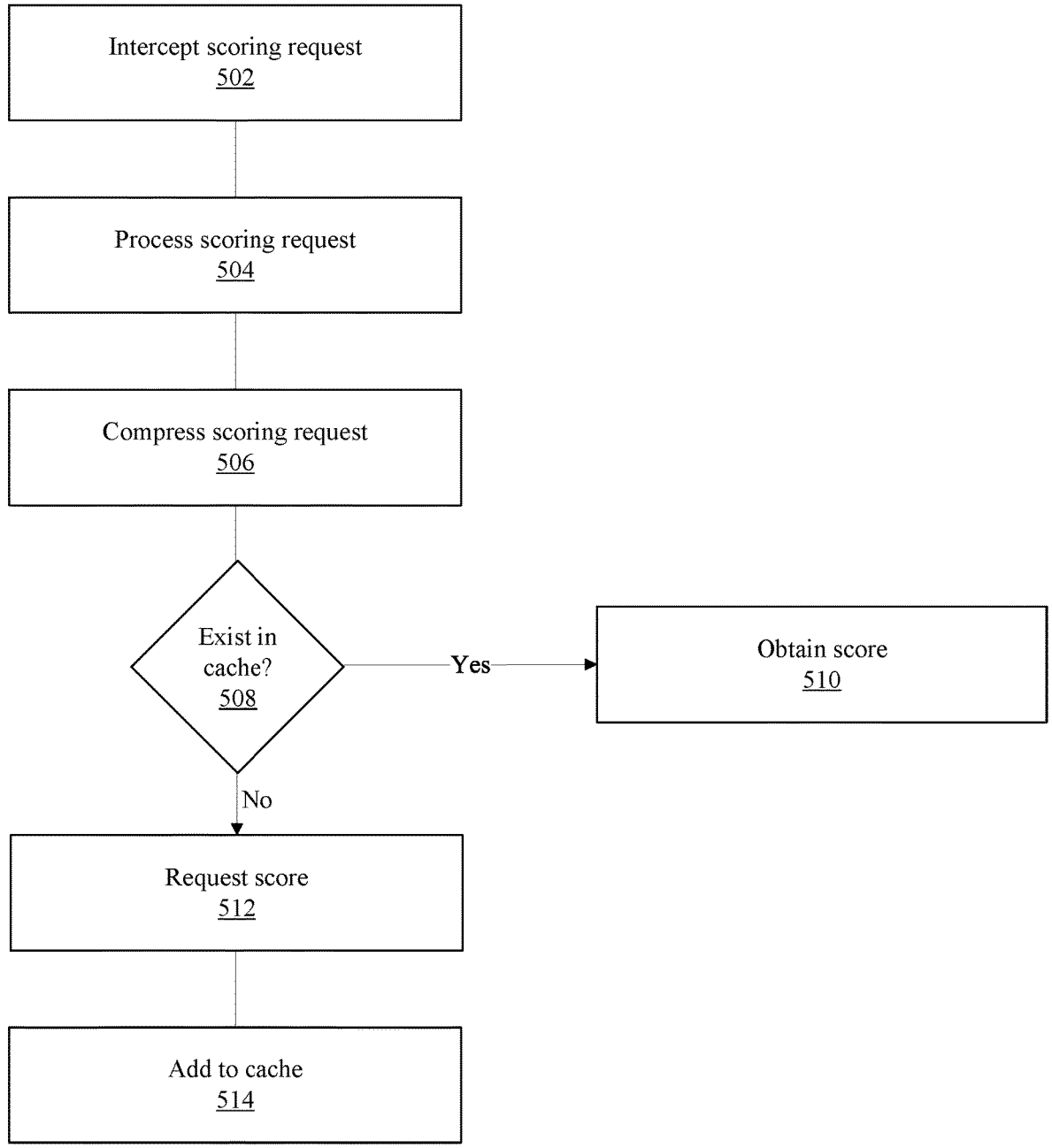
FIG. 5 illustrates a flowchart of an exemplary process for reducing the number of predictions made by a machine learning system, according to one embodiment.

FIG. 5 illustrates an exemplary method for processing new, incoming scoring requests in a machine learning environment wherein near real-time predictions are required. The process begins by intercepting 502 an incoming scoring request. The intercept procedure prevents an incoming request from being processed by the prediction engine in a deployed machine learning system.

Thereafter, the scoring request is processed 504 to remove features and/or feature values that have little to no impact on the score that will be computed using the machine learned model. Furthermore, the scoring request is prepared such that certain feature values are included in categories or buckets that include a range. For example, if the incoming scoring request includes a number 4, the data may be placed in a category ranging from numbers 1-5, etc. Additional detail regarding processing data is provided in reference to FIG. 4, and incorporated herein with reference to incoming data request queries as well.

The process also applies compression 506 to the incoming scoring request. In one embodiment, a checksum or a cryptographic hash function may be applied to compress the processed 504 scoring request, and to make it easier to determine whether the incoming scoring request query matches another query in a cache that has already been scored. A variety of different compressions methodologies may be used, as would be apparent to a person of ordinary skill in the art, without departing from the scope of the invention. Exemplary compression methodologies include, but are not limited to MD5, SHA-1, CRC3, etc. The compression methodology used in this step, 506, must be the same as the compression methodology used on the training data (discussed in FIG. 4 in reference to step 410) to ensure that the two compressed values may be compared quickly and easily. Additional information regarding the compression step is provided in reference to FIG. 4, and incorporated herein by reference.

The process determines 508 if the incoming scoring request exists in cache. A checksum or a cryptographic hash match is used to determine if an incoming scoring request query has been scored and saved in the cache. In one embodiment, wherein the hashed data is stored in a table, a lookup query may be used to determine if there is a match. If there is a match, then the score associated with the matched entry in the table is retrieved 510. If no matches are found, then the scoring request is passed 512 to the online scoring system that uses a trained model. Once the score is assigned to the incoming scoring request, then the score is added 514 to the cache along with the compressed value for the incoming scoring request.

Drift Detection System

Figure 11:
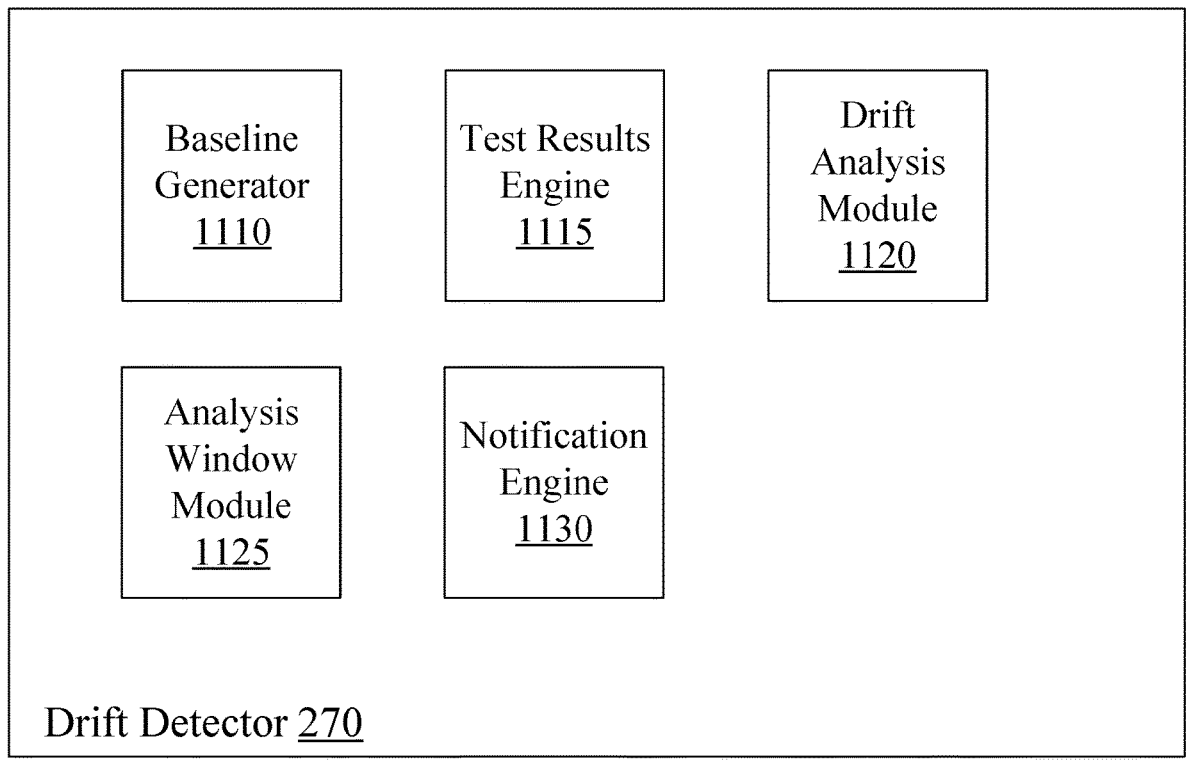
FIG. 11 illustrates components of drift detection system in accordance with an exemplary embodiment of the invention.

Referring now to FIG. 11, which illustrates the drift detector 270, herein also referred to as the deviation analysis engine 270, in greater detail. In one embodiment of the invention, the drift detector 207 is comprised of baseline generator 1110, test results engine 1115, drift analysis module 1120, analysis window module 1125, and notification engine 1130.

The baseline generator 1110 obtains offline training dataset that is used to train a model in an offline environment. The offline dataset is thereafter batch scored in an online environment. The batch scores are then logged by the baseline generator 1110 in an initialization file as "baseline" results.

The test results engine 1115 receives scores in near real-time. More specifically, the test results engine 1115 receives incoming scoring requests and the score that is assigned to each incoming scoring request as a result of applying a machine learning model that is learned by the offline learning system. The scores and the associated incoming scoring requests may be stored in near real-time and logged as "test" results by the test results engine 1115.

The drift analysis module 1120 measures the deviation between the offline "baseline" model that is generated by the baseline generator 1110 and the online "test" model that is generated by the test results engine 1115. The drift analysis module 1120 merges the two results (this operation may be also be performed by the merge engine 255 that is illustrated in FIG. 2. The drift detector 270 may use a variety of methods for identifying a drift or a deviation in the merged results. A few specific methodologies are detecting deviations are described in reference to FIG. 12, however, other methodologies may be used, as would be readily understood by a person of ordinary skill in the art, without departing from the scope of the invention.

In one embodiment of the invention the analysis window module 1125 determines whether a comparison between the test and the baseline should be made. For example, the analysis window module 1125 may determine that a comparison can be made if the comparison window is equivalent to the training window. Per model, a configurable time window is established based on the variance tolerance and the velocity and volume of data. In other words, the analysis window represents the amount of time that will be evaluated when comparing the real time events to the historical baseline to determine if drift is occurring. The window is configurable by the user based on factors including: volume and velocity of data, anticipated rate of change of input data, and the risk associated with drift occurring and the immediacy of remediation. In one embodiment, if any one or more factors disclosed above are greater, the configurable time window may be longer. In one embodiment, if any one or more factors are greater, the configurable time window may be shorter.

In one embodiment of the invention, the notification engine 1130 determines whether a detected drift is statistically significant by applying higher level analysis, such as model prediction score distributions, model variable profiling statistics, time window comparison/rate of change, model variable predictive power or relative importance, risk factor (i.e. what is risk to a business model if the model result is incorrect). If the drift is statistically significant, the notification engine 1130 generates an alert.

Process for Detecting Drift

Figure 12:
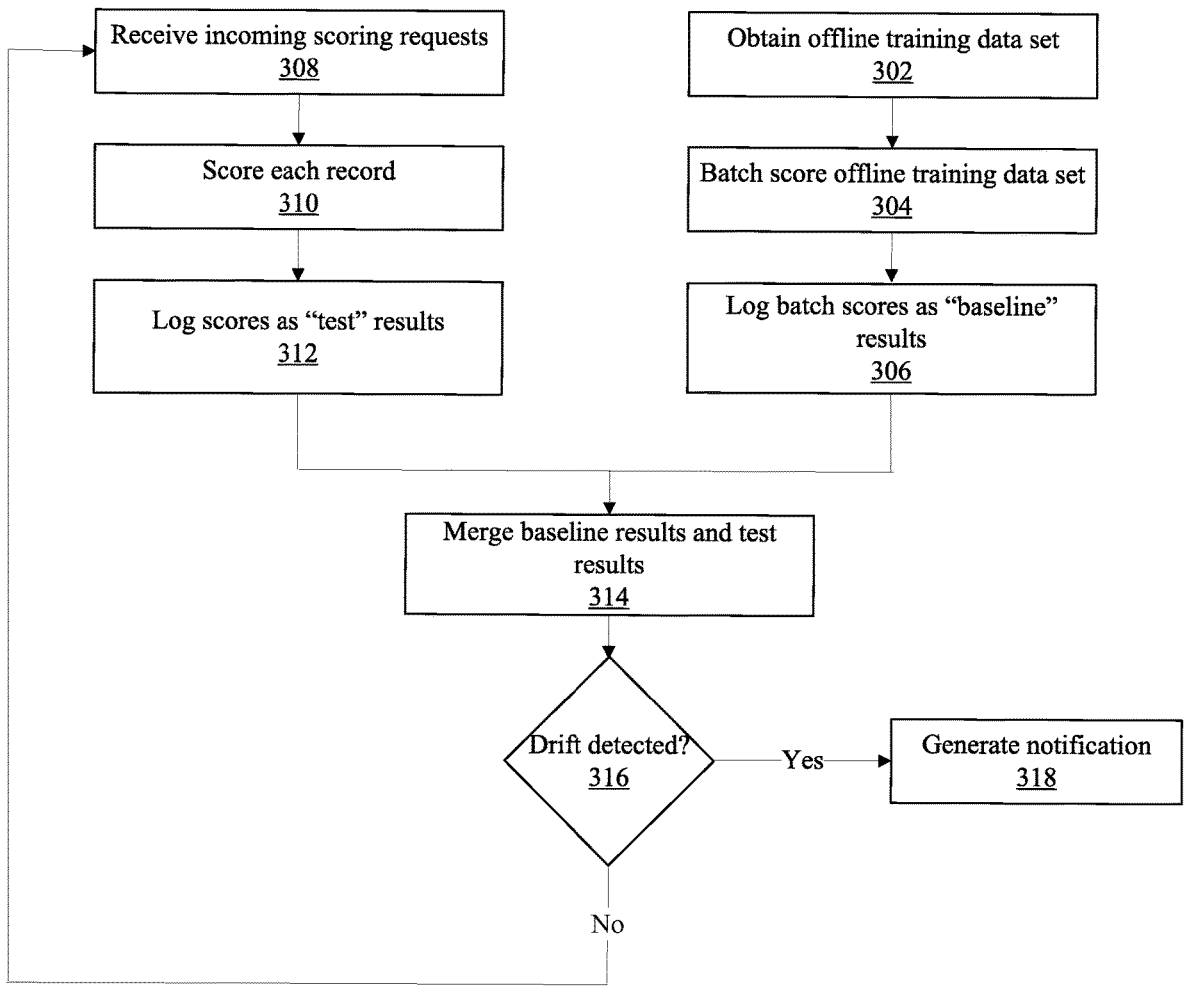
FIG. 12 illustrates an exemplary process for detecting drift in accordance with an embodiment of the invention.

FIG. 12 illustrates an exemplary process for detecting performance degradation (caused by drift) of an online scoring system in a machine learning/classification system. The process includes the steps of obtaining 1202 an offline training data set, batch scoring 1204 the offline training data set, logging 1206 the batch scores as "baseline" results, receiving 1208 incoming scoring requests, scoring 1210 each record in near real-time, logging 1212 scores as "test" results, merging 1214 "baseline" results and "test" results, determining 1216 if a drift exists based on merge operation, and generating 1218 a notification if drift is detected.

The process begins by obtaining the offline training dataset 1202 that is used to train a model in an offline environment. The offline dataset is thereafter batch scored 1204 in an online environment. The batch scores are then logged 1206 in an initialization file as "baseline" results.

The process also receives incoming scoring requests 1208. Each scoring request is scored 1210 by collecting real time data inputs, and applying the machine learned models that are learned by the offline learning system. The newly scored online scores are thereafter logged as "test" results.

Once the "baseline" results and the "test" results are logged, the process merges the two results for comparison. The process, thereafter, identifies if there is a drift within the merged results. A variety of different methodologies may be used to detect drift, one of which is described in reference to FIG. 13. Other drift detection methodologies may be used without departing from the scope of the invention. If there is a drift in the merged result, then the process generates a notification 1218. Drift indicates, generally, that the performance of the online scoring system may be degrading. In this manner, the process identifies and detect potential performance degradation issues, which may otherwise not be detected until much later process, which typically occurs when the classification or the scoring system breaks down entirely.

Figure 13:
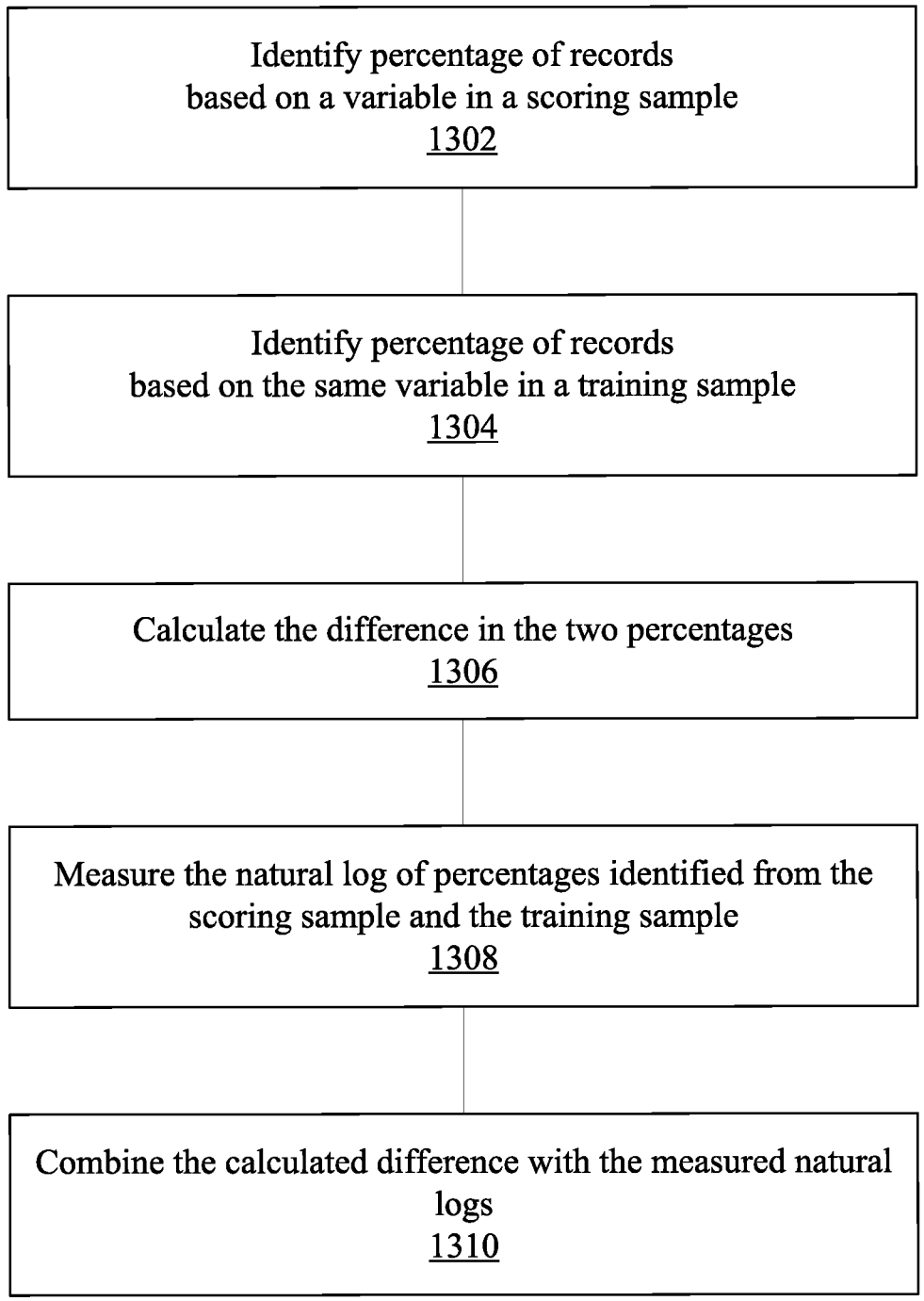
FIG. 13 illustrates a specific exemplary process for calculating drift in accordance with an embodiment of the invention.

FIG. 13 illustrates an exemplary process for detecting drift. The process begins by calculating percentage of records based on a particular variable in a scoring sample 1302, calculating percentage of records based on the same variable in a training sample 1304, calculating the difference in percentages 1306, calculating the natural log of percentages calculated from the scoring sample and the training sample 1308, and combining the calculated difference with the calculated natural logs. The process may repeat iteratively with each variable in the scoring sample and the incoming scoring request records. If the combined result 1310 is above a certain threshold value, then a drift notification may be created. But if the combined value 1310 is below a threshold, then the process continues without initiating a drift notification.

The process described in FIG. 13 is exemplary. Other methods of detecting drift may be used without departing from the scope of the invention.

Because the inventing system and method detects connects the offline and the online systems in an novel way, the system and method disclosed herein are enabled to generate notifications in real-time or near real-time manner, and have users take action in a meaningful way before the drift introduces errors and performance degradation into scores that are output by the system in response to incoming scoring requests.

Anomaly Detection System

Figure 14:
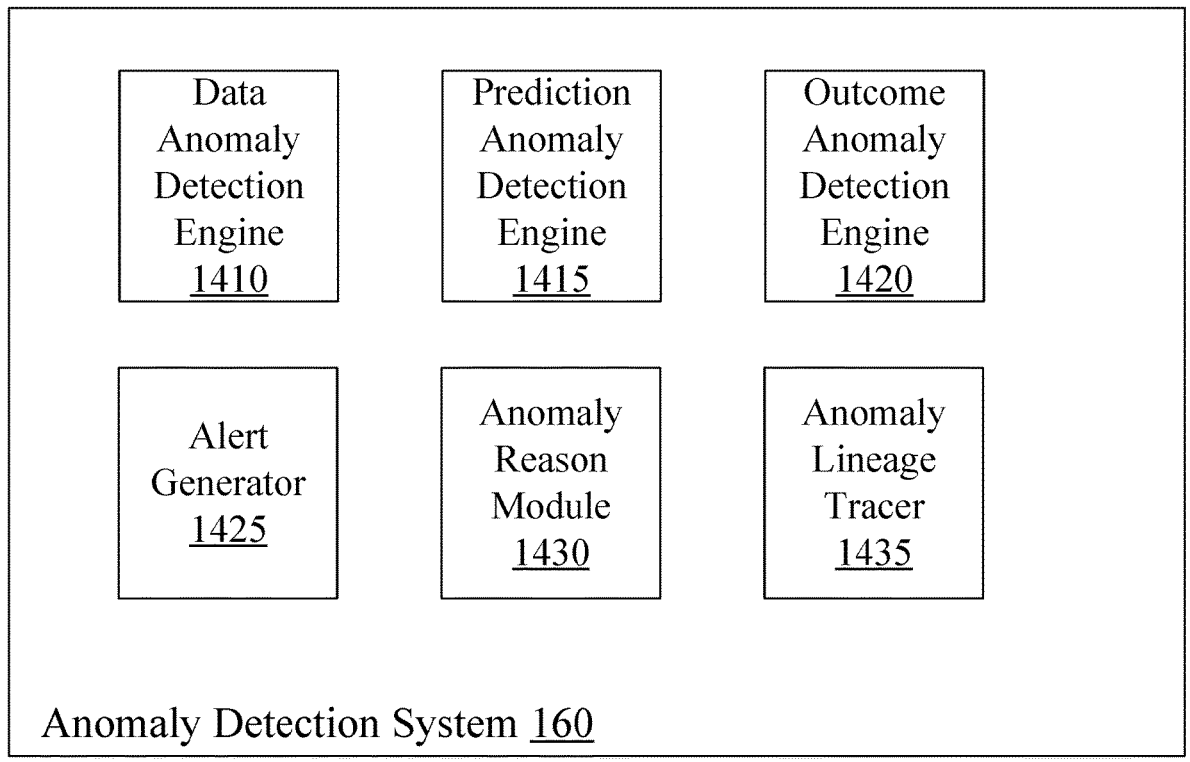
FIG. 14 illustrates components of an anomaly detection system in accordance with an exemplary embodiment of the invention.

FIG. 14 illustrates an exemplary anomaly detection system for identifying anomalies in real-time or near real-time, in accordance with one embodiment of the invention. The system includes a data anomaly detection engine 1410, prediction anomaly detection engine 1415, outcome anomaly detection engine 1420, and an alert generator 1425. The various elements of the anomaly detection engine enable the inventive system and method to detect anomalies in real-time or near real-time.

The data anomaly detection engine 1410 identifies anomalies in incoming scoring requests. Anomalies in the scoring requests may be identified at a variety of different levels. In one embodiment, the data anomaly detection engine 1410 performs domain checks for categorical variables, and detects out of bound values for continuous variables. For example, if categorical variables in the training set include a designation for a states in the United States, then the data anomaly detection engine 1410 identifies scoring requests wherein the state designation does not correspond to any known state designation, either based on a dictionary or based on values extracted from the training dataset. In another example, if continuous variables in a training dataset include age, then the data anomaly detection engine 1410 identifies age data in incoming scoring requests that are out of bounds, or should not be scored for any number of reasons, including, the user may be too young, for example, for a credit card application process. Sometimes, unknown or unrecognized values such as null, unknown, or out of bound values may be assigned a variable in a technique called variable imputation. In one embodiment, the data anomaly detection engine 1410 monitors for an increase in number of records with a default or imputed value over time in accordance with the disclosure herein to detect data anomalies.

In one embodiment of the invention, the data anomaly detection engine 1410 performs statistical analysis on the incoming scoring requests to identify out of bound values in a combination of values in the incoming scoring requests. In other embodiments, the data anomaly detection engine 1410 identifies unexpected values in a combination of values in the incoming scoring requests. In one embodiment the data anomaly detection engine 1410 uses the model score recall caching functionality to cache all combinations of the model training dataset and in real time or in near real-time, apply the same compression technique to the incoming scoring request, check cache for that entry and if does not exist, flag the score request as anomaly type of unrecognized variable value combination. In one embodiment, the data anomaly detection engine 1410 applies a machine learning to the incoming scoring requests to determine if unexpected values are present in a combination of values in the incoming scoring requests. When anomalies or null/unknown scores are produced in predictive scores, it can be very difficult to determine which variable or combination of variables is unrecognized to the model. In this case, predictive models may be used to model which variables or combinations of variables are common to scoring requests that produced null or unknown scores.

The prediction anomaly detection engine 1415 detects anomalies in the scores output by the online processing system 140. In one embodiment, the prediction anomaly detection engine 1415 checks thresholds, ranges, null/0 scores, and drifts in scores output by the online processing system 140, and compares them to historical trends established from training and/or validation datasets to detect score anomalies in real-time or near real-time. For example, decision tree models are comprised of large trees of instantiated business rules, if a combination of input variables is passed to the decision tree model that does not have a predefined branch in the decision tree, a null/0 score will likely be returned. Additional examples, include shifts in distributions of scores over time due to shifting populations or input variable combinations, or external factors such as macroeconomic conditions (interest rates, etc.) that may not be included in the model inputs, yet would affect the populations behavior in regards to a credit lending model and cause the model scores to drift over time and model performance to degrade. Additionally, the prediction anomaly detection engine will provide diagnostics and reason codes as additional inputs to the alert generator indicating the nature of the anomaly to those responsible for monitoring prediction health to ease debugging and root cause analysis.

The outcome anomaly detection engine 1410 detects anomalies in outcomes (business rules wrapped). In one embodiment, outcomes represent an additional layer of derivation that converts raw model predictions into business decisions and prescribed outcomes based on the combination of one or more predictions and additional business rules or interpretations. Examples include: simple thresholding of predictive propensity scores (0.0 to 0.3="low risk", 0.3 to 0.7='medium risk", 0.7 to 1.0="high risk") where the bands and distributions are predefined based on the initial distributions and break points in the training and/or validation datasets. Another example would be a customer segmentation model predicting high, medium, and low customer lifetime value customer groups and mapping those clusters to a prescribed customer experience or set of incentive offers. In image recognition scenarios, beyond the prediction itself, there is often a confidence score associated with the prediction which could be used to further influence the outcome provided based on the confidence in the prediction (high confidence=automated decision, low confidence=manual intervention and decision). In each example, if the outcome logic is loosely coupled to the prediction logic in the implementation, it is possible for the two to become out of sync over time and amplify the effect of drift between the predictions and the business outcomes. Additionally, the outcome anomaly detection engine will provide diagnostics and reason codes as additional inputs to the alert generator indicating the nature of the anomaly to those responsible for monitoring prediction health to ease debugging and root cause analysis.

The anomaly reason module 1430 identifies the reason that a anomaly was detected by the anomaly detection system 160. Generally, in traditional machine learning and scoring systems it is very difficult, if not impossible to identify the specific reasons as to why an anomaly occurred. In traditional systems, an anomaly may be detected when the model outputs a null/0/void result. However, the cause of the anomaly is often complex and difficult to discover through currently available tools. The offline/online architecture described herein, however, enables that analysis because incoming scoring requests are logged and, as described herein, cached. Thus, each incoming scoring request that receives a null/0/void score may be triaged in accordance with the disclosure herein to identify the source of the anomaly. Once the source of the anomaly is detected, it is identified and presented to a user for further analysis and/or action. FIG. 18 illustrates a graphical user interface identifying various data regarding the training system, the incoming scoring requests, and scores that are obtained by applying a machine learning model. Specifically, FIG. 18 illustrates anomaly reasons, which are user friendly reasons as to the likely source of an anomaly; illustrated in FIG. 18 as Unrecognized Categorical Value, Unexpected Feature Combination. Other anomaly sources may be detected and displayed in accordance to the disclosure herein.

Figure 17:
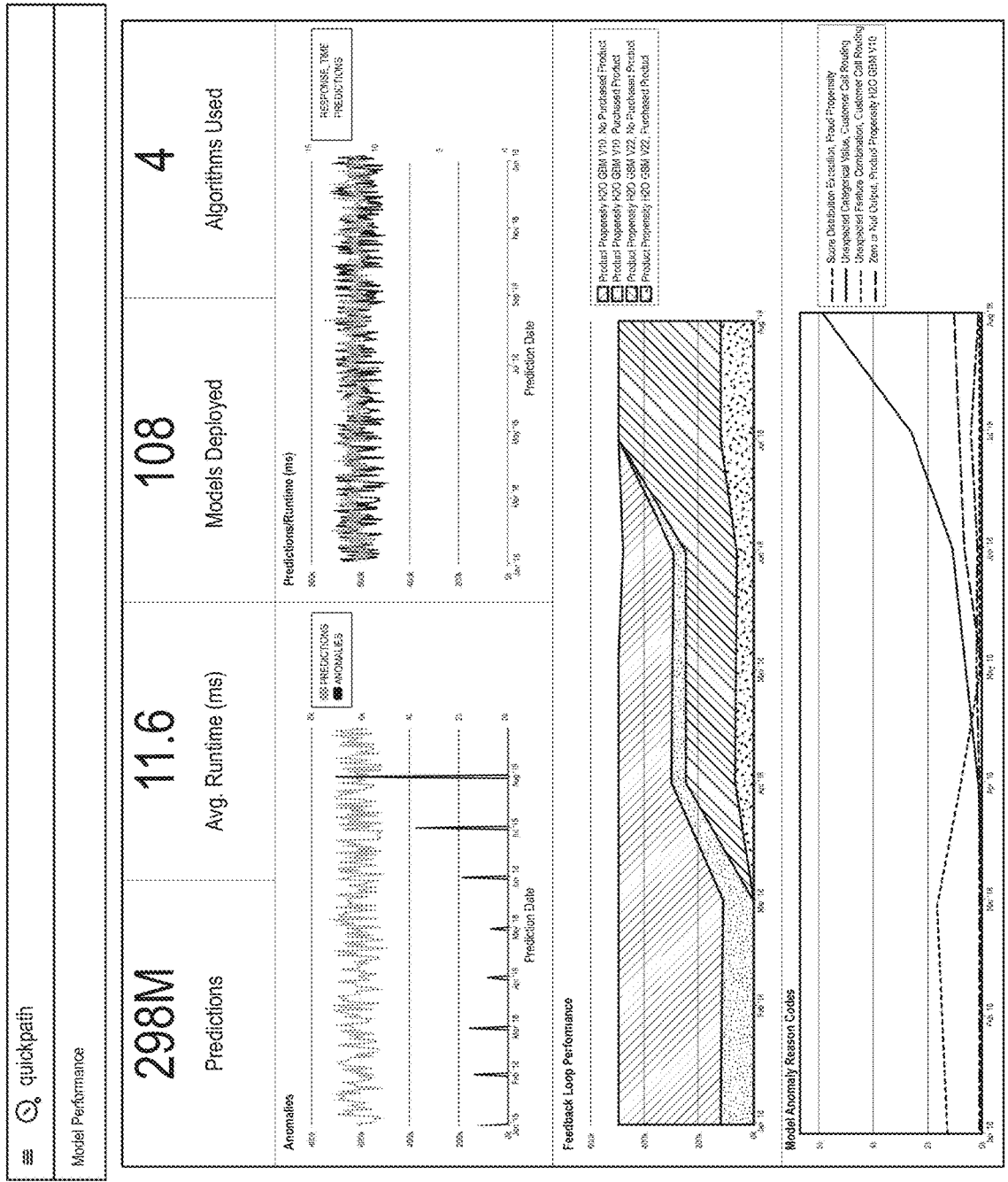
FIG. 17 illustrates an exemplary graphical user interface displaying anomaly reasons in accordance with an embodiment of the invention.
Figure 18B:
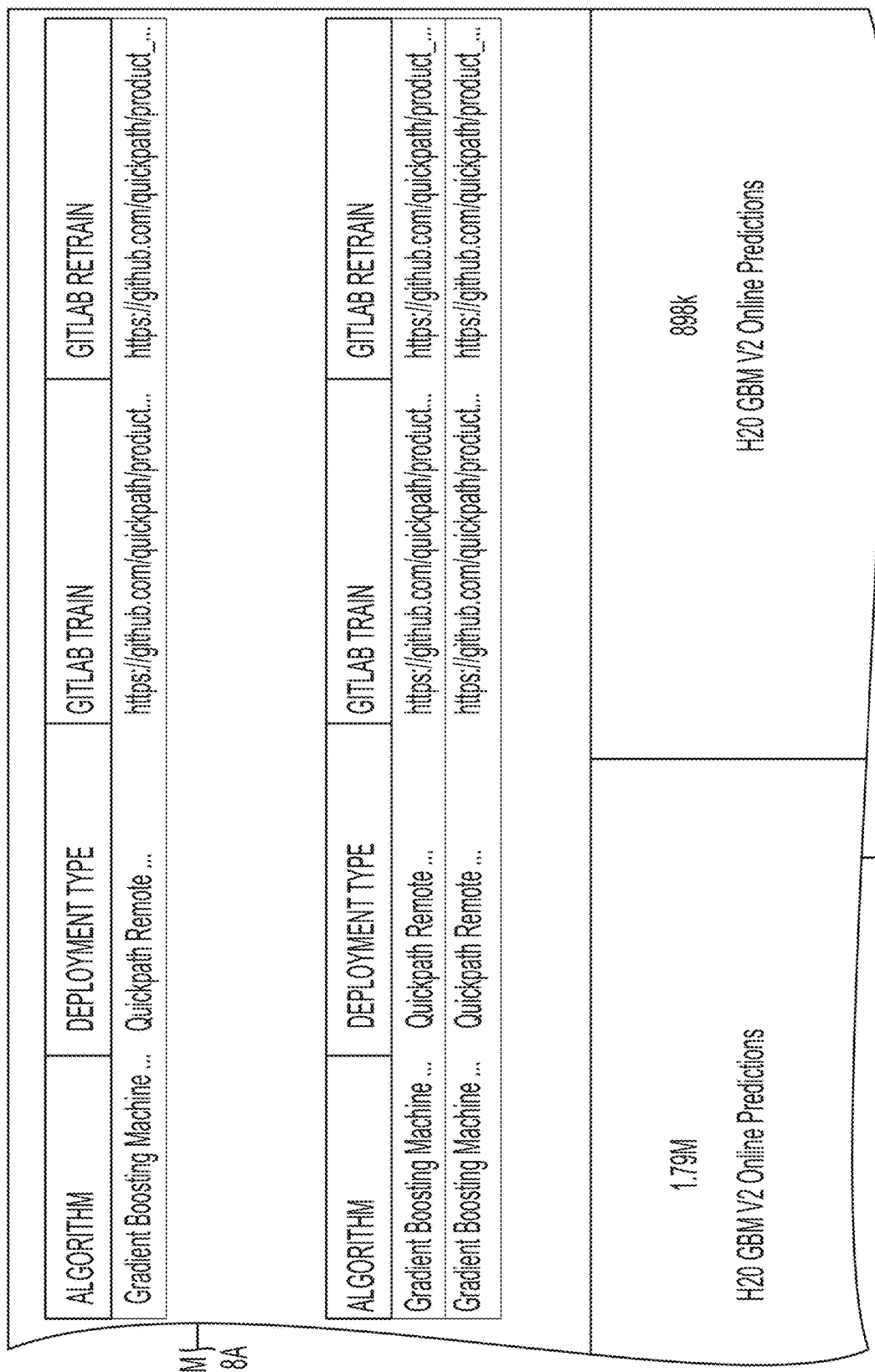
Figure 18E:
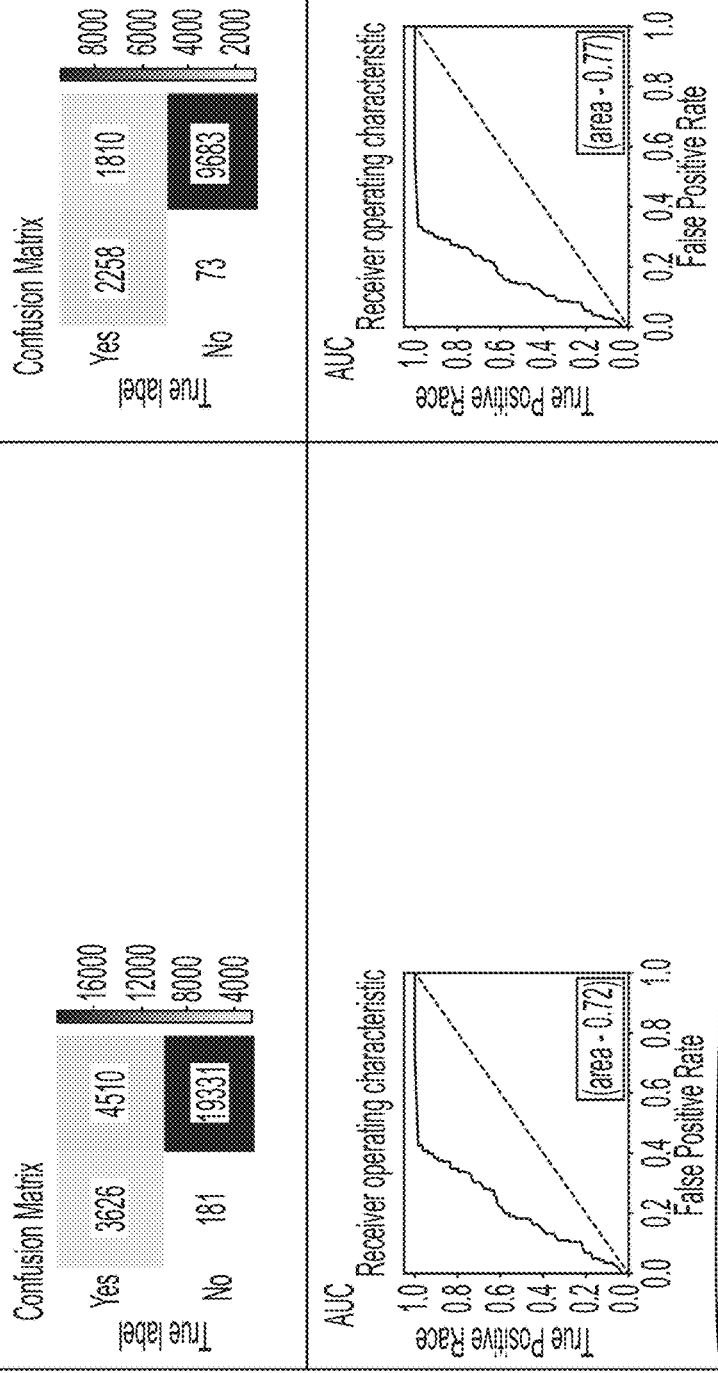
Figure 18F:
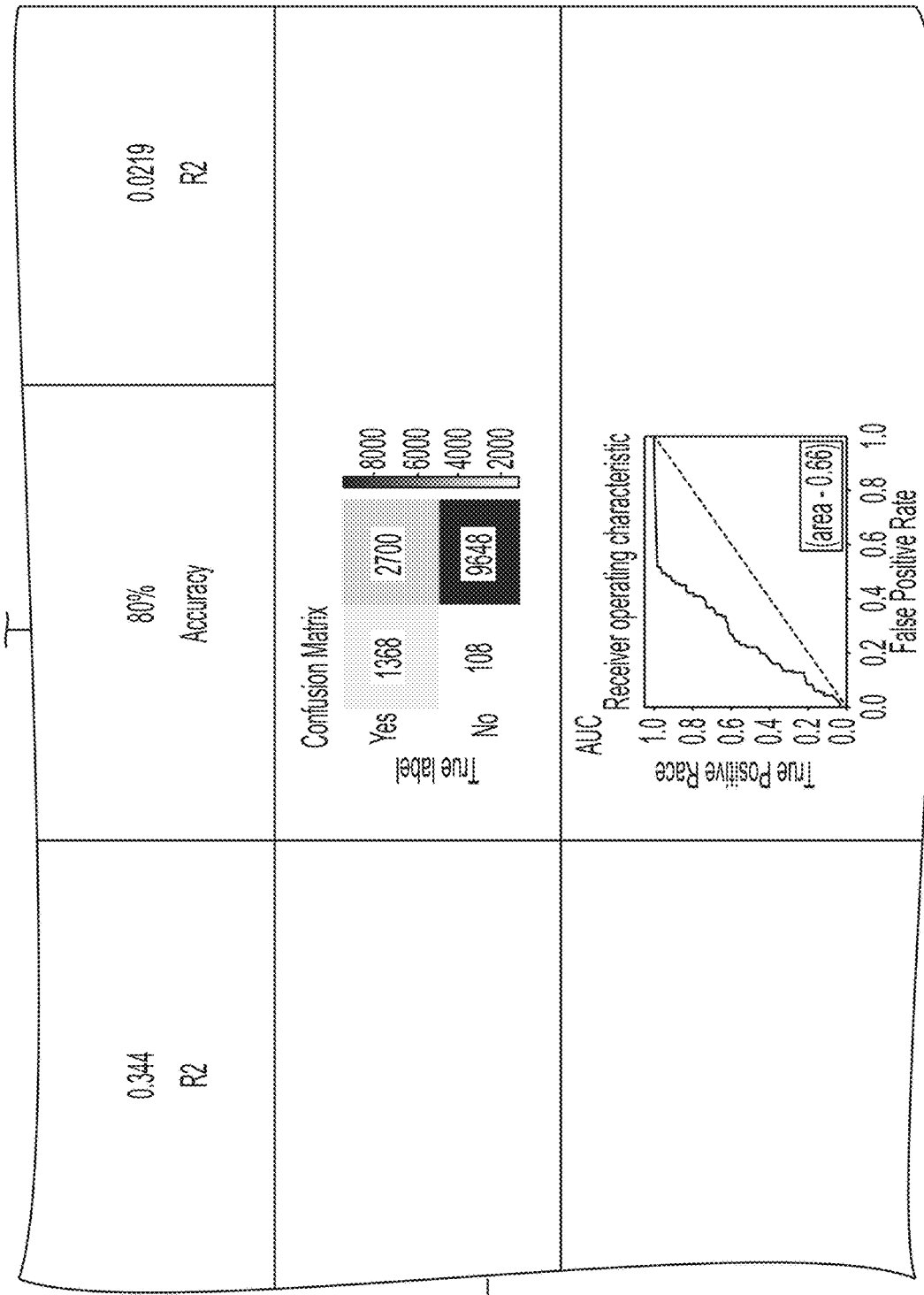
Figure 18G:
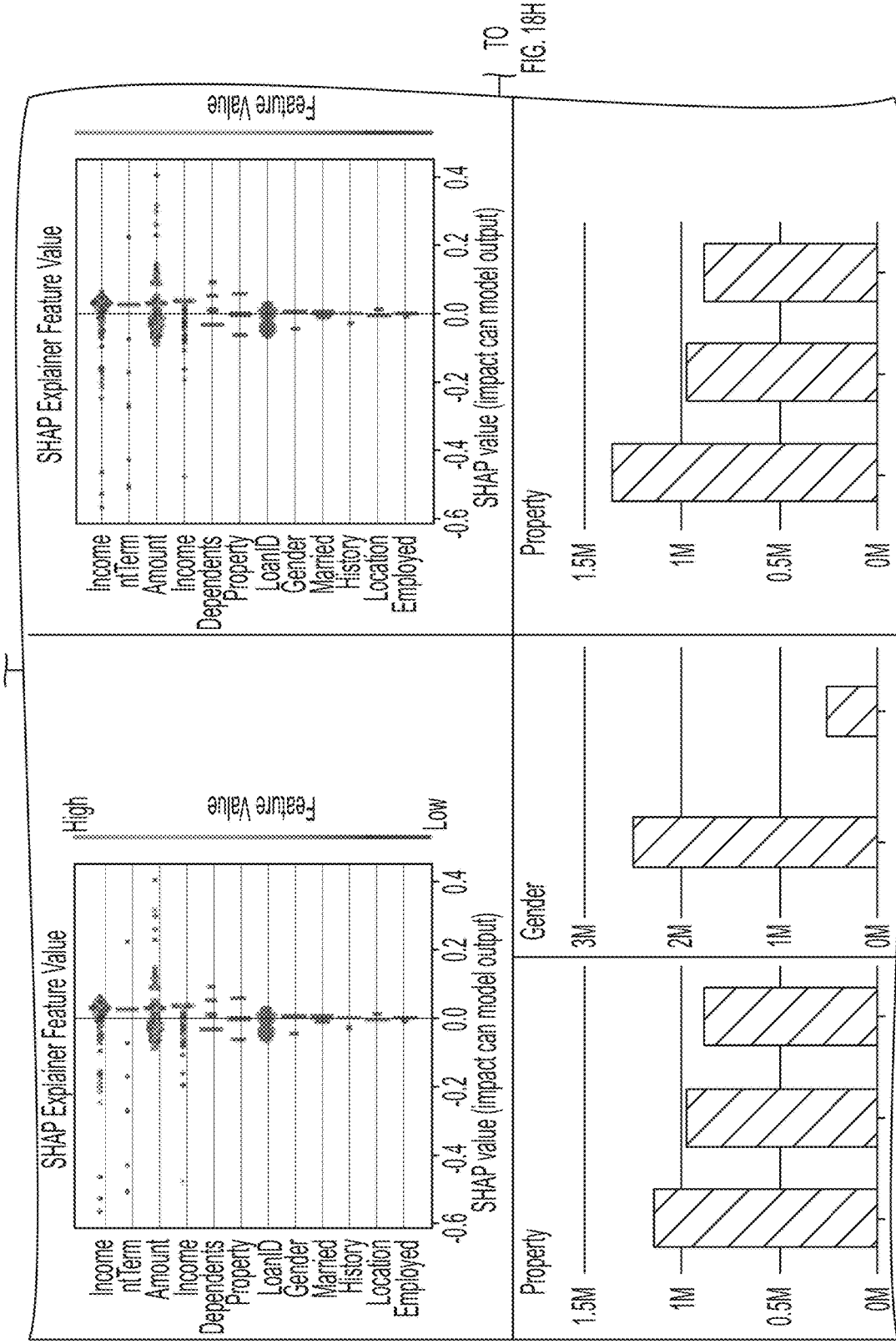
Figure 18H:
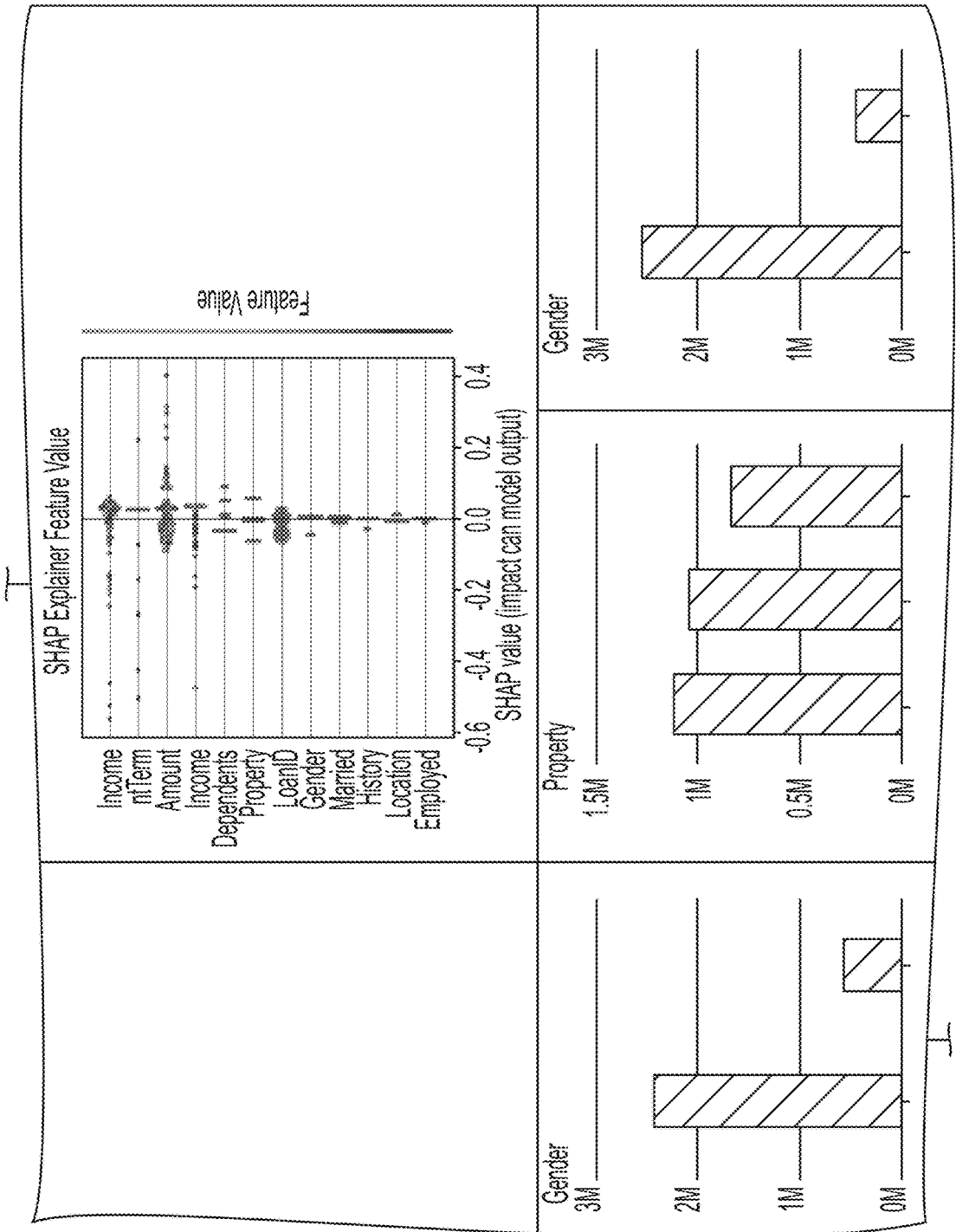
Figure 18I:
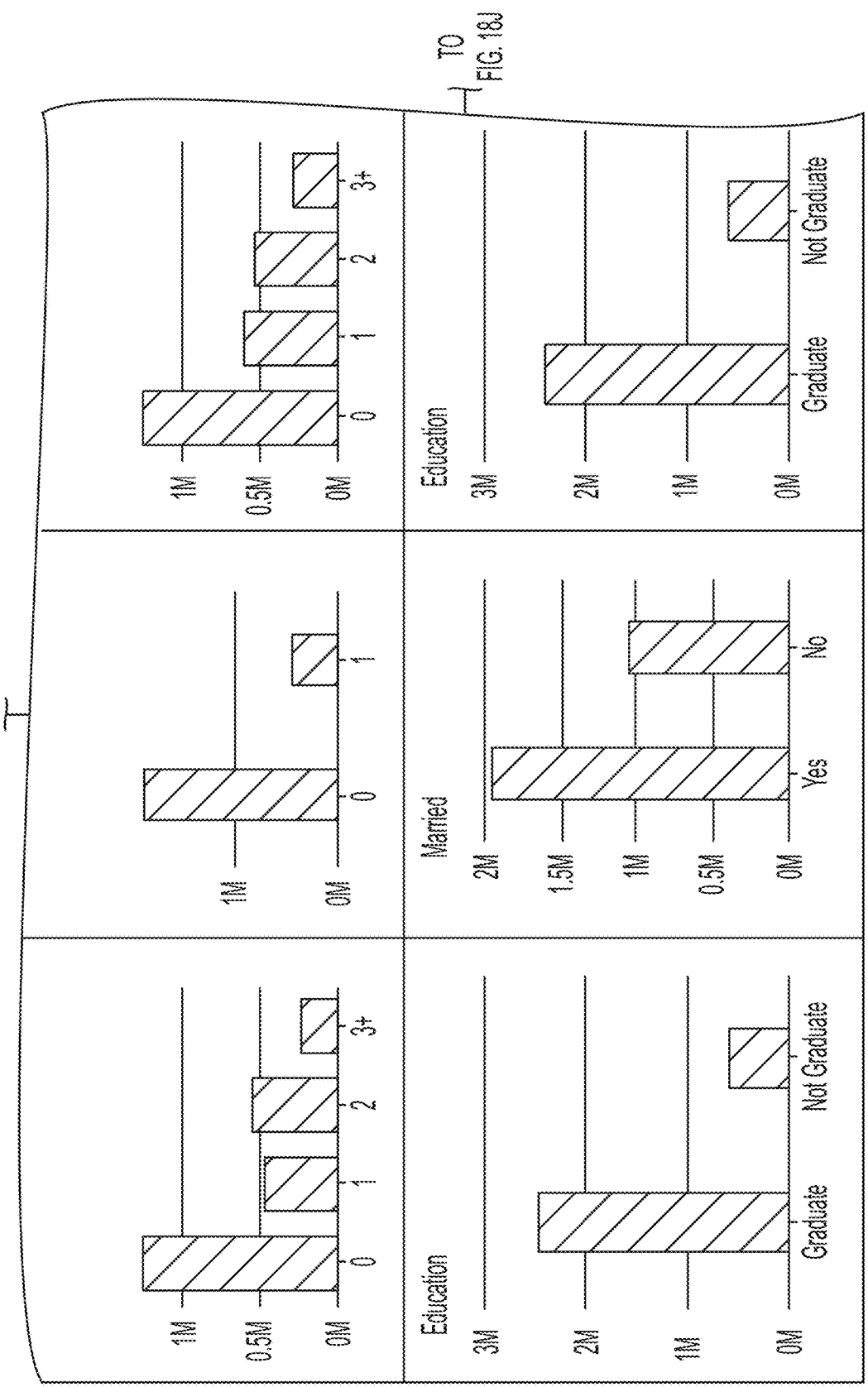
Figure 18J:
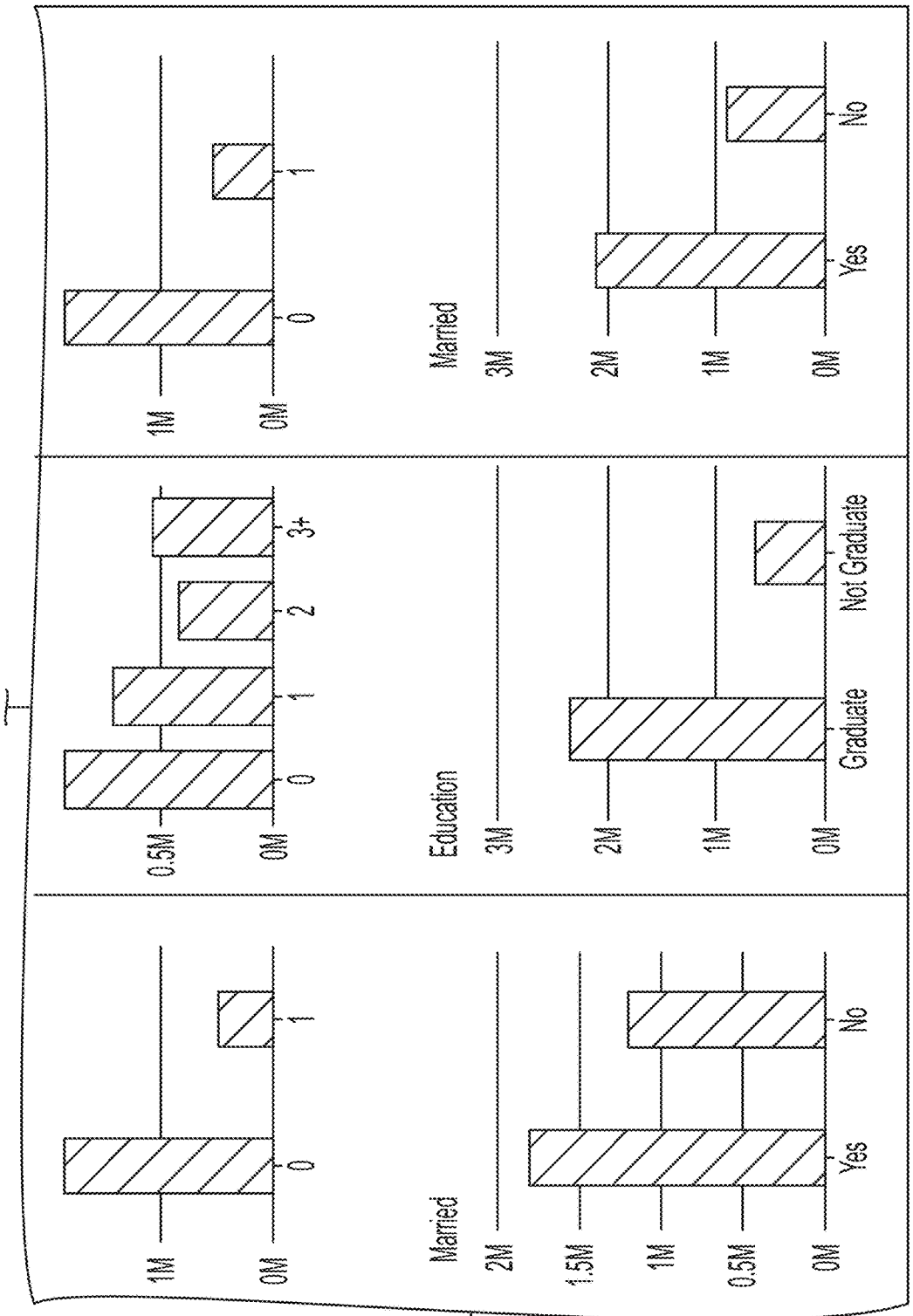

The anomaly lineage tracer 1435 traces the source of the anomaly as generally described in reference to the anomaly reason module 1430. When one or more anomalies is identified on a given request, the online/offline platform disclosed herein can not only recognize the anomalies, provide a reason(s), the platform can provide the complete data lineage and original source of the data element(s) that cause the anomaly. FIG. 17 illustrates one exemplary graphical user interface in that illustrates the output that is produced by the anomaly lineage tracer 1435, including, for example, source distribution exception, unexpected categorical value, unexpected failure combination, zero or null output, etc.

The alert generator 1425 generates an alert if any of the anomaly detectors, including the data anomaly detection engine 1410, prediction anomaly detection engine 1415, or outcome anomaly detection engine 1410 detects an anomaly. In one embodiment, the alert generator 1425 generates an alert if a single anomaly is detected. In other embodiments, the alert generator 1425 may compile a sufficient number of anomalies before generating an alert.

Process for Detecting Anomalies

Figure 15:
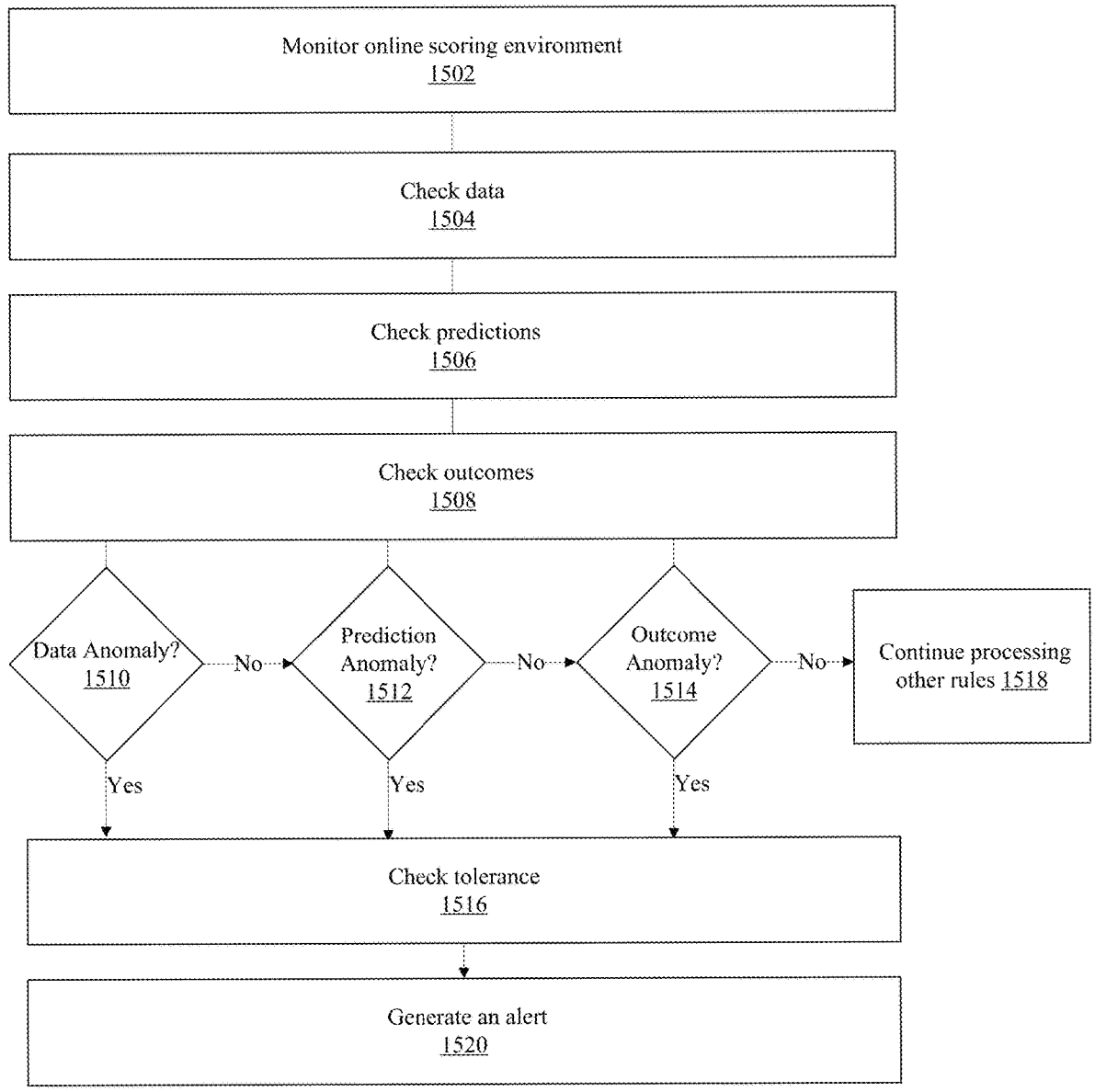
FIG. 15 illustrates an exemplary process for detecting anomalies in accordance with an embodiment of the invention.

FIG. 15 illustrates an exemplary process for detecting anomalies in real-time or near-real-time in accordance with an exemplary embodiment of the invention. The process comprises monitoring the online processing environment 1502, checking data 1504, checking predictions 1506, checking outcomes 1508, determining whether a data anomaly is detected 1510, a prediction anomaly is detected 1512, an outcome anomaly is detected 1514. If no anomalies are detected, then the process continues by processing other rules 1518. If an anomaly is detected, then the process determines if a particular tolerance is obtained 1516, and, if it is, then an alert is generated 1520.

In one embodiment of the invention, the process monitors the online processing or scoring environment 1502 by checking 1504 categorical and continuous variables in the incoming scoring requests, checking 1506 predictions made by the online scoring environment, and/or checking 1508 outcomes associated with the predictions. For example, the process checks 1504 for skews in variable distribution, continuous variables, and categorical variables, null or blank model input values, recognizing blacklisted words to prevent bias ML models (for NLP/NLU), and ML input threat detection. Checking 1506 the prediction data may comprise checking prediction volume distribution changes (e.g. scores move up or down), and null or zero score predictions. Checking 1508 outcome anomalies may comprise comparing outcome volume distribution changes (e.g.: training vs scoring), and comparing outcome in relation to prediction volume distribution changes (e.g.: low prediction scores are outperforming high prediction scores)

The process determines if there is an anomaly detected in any of the items. An anomaly may be detected in scoring data 1510, prediction scores 1512, and outcomes 1514 that are generated from the prediction data in accordance with the disclosure above. If an anomaly is detected, the process checks if a particular tolerance 1516 is achieved with respect to the detected anomaly. A tolerance level may require a sufficient number of anomalies to be detected before going to the next step in the process. In one embodiment, the tolerance level may require a sufficient number of the same anomalies are detected. If the tolerance threshold is reached, then an alert may be generated 1520. If no anomalies are detected, the other rules within the online scoring environment may be executed.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 6:
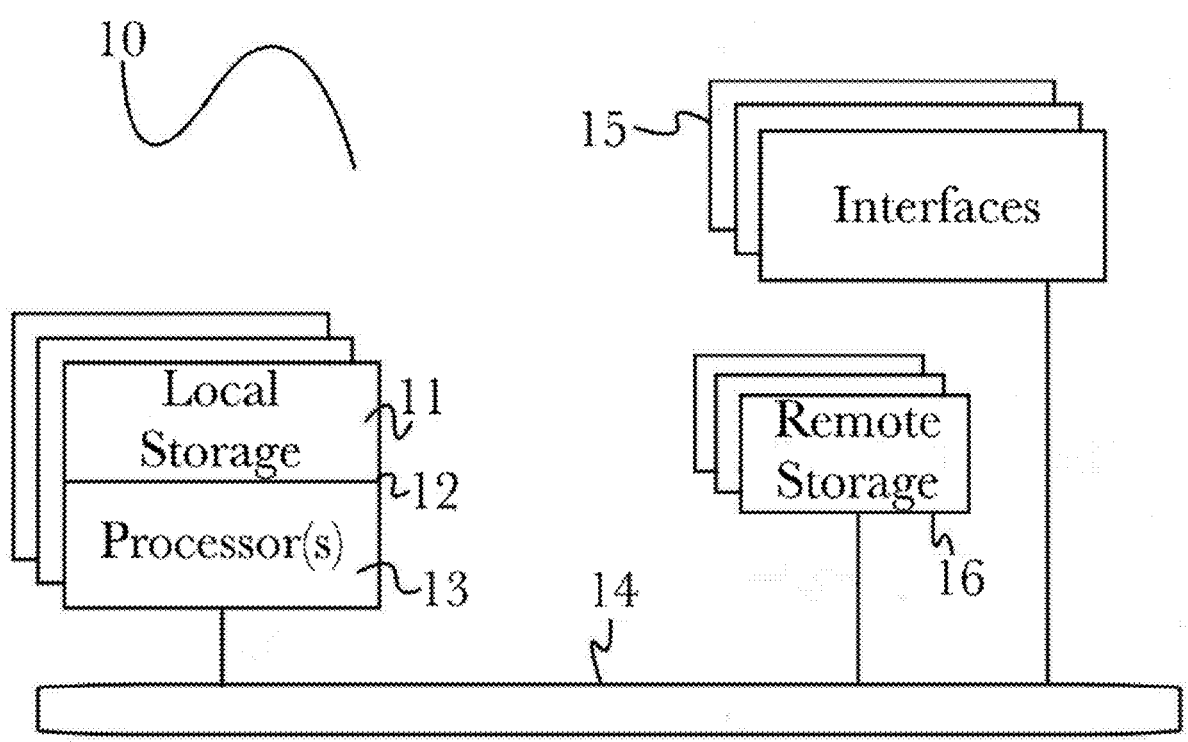
FIG. 6 illustrates one embodiment of components of an example machine able to read instructions from a machine-readable medium and execute them in a processor (or controller).

Referring now to FIG. 6, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 5 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
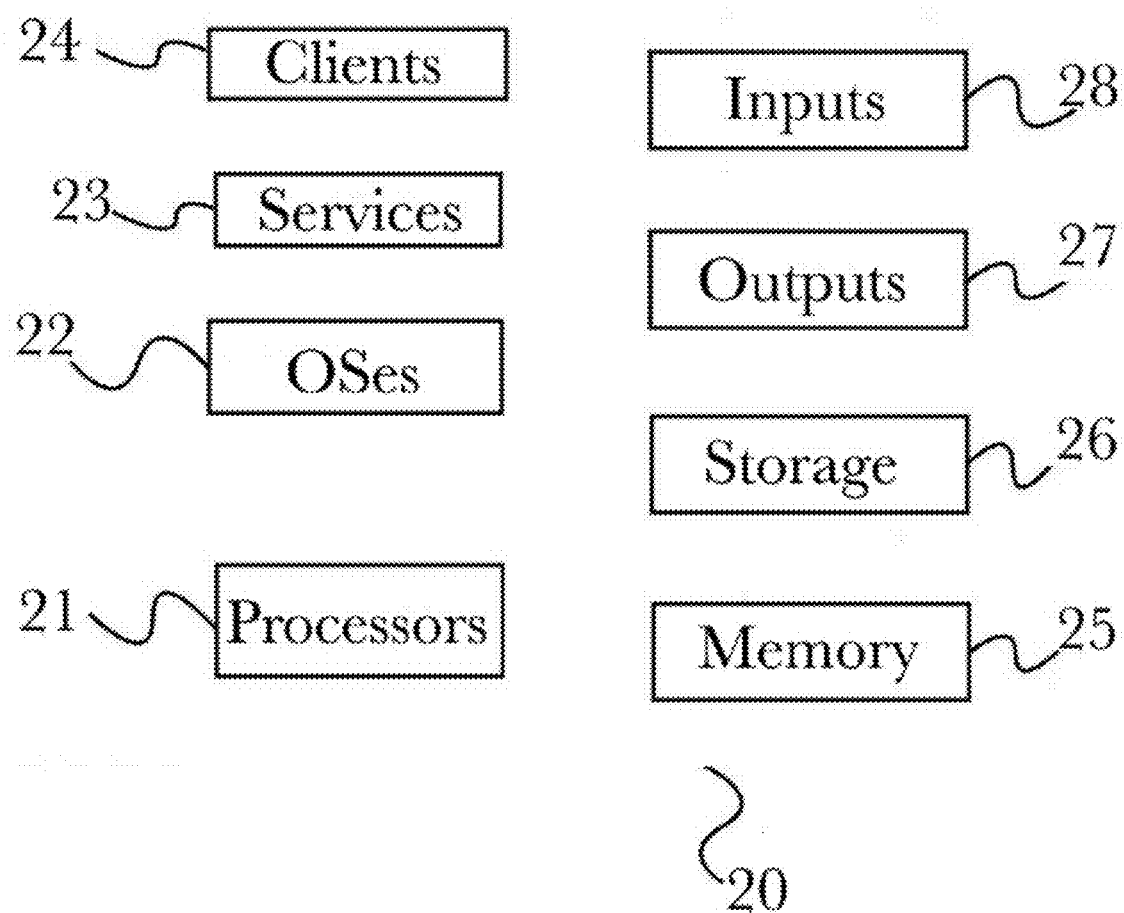
FIG. 10 illustrates components of a computing device that supports an embodiment of the inventive disclosure.

In some embodiments, systems may be implemented on a standalone computing system. Referring now to FIG. 10, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 7:
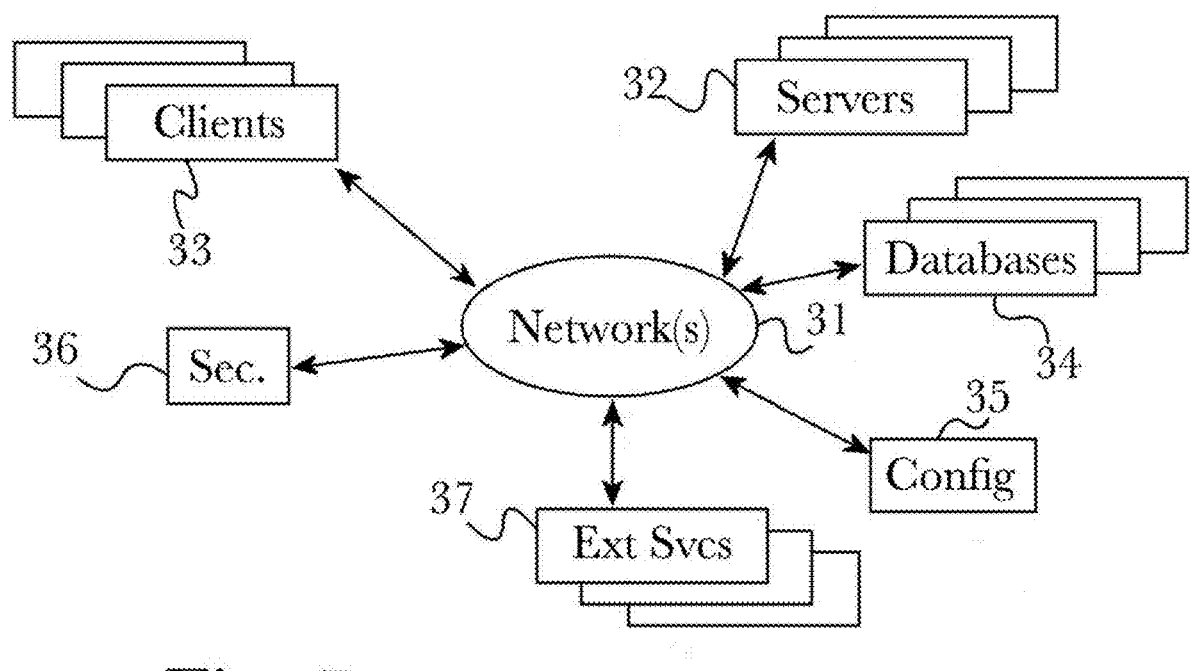
FIG. 7 illustrates on embodiment of the computing architecture that supports an embodiment of the inventive disclosure.

In some embodiments, systems may be implemented on a distributed computing network, such as one having any number of clients and/or servers. Referring now to FIG. 7, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 6. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 8:
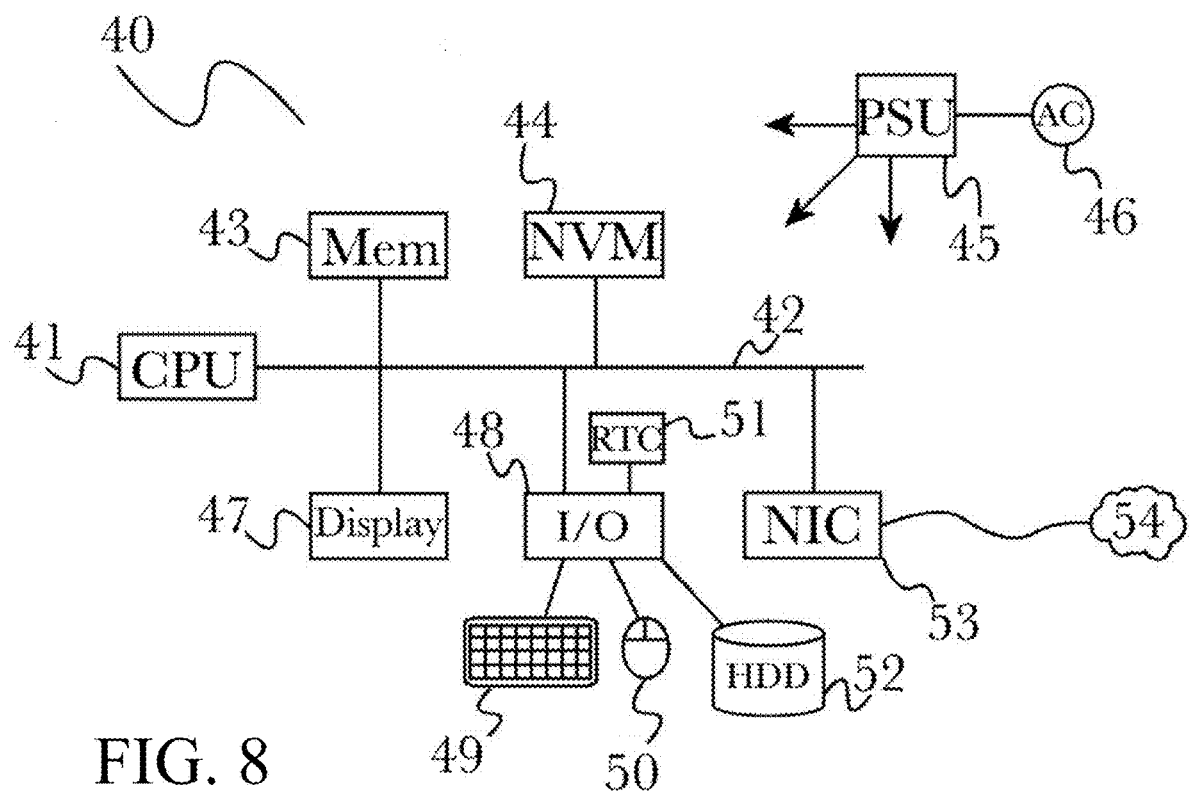
FIG. 8 illustrates components of a computing device that supports an embodiment of the inventive disclosure.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer-implemented method for detecting whether an online, real-time machine learning and scoring system is degrading, the computer-implemented method comprising:
    scoring incoming scoring requests in a near real-time scoring environment, the scoring based on a machine learning model that is trained by using training datasets;
    receiving batch scores assigned to the training dataset;
    determine whether the scored requests should be compared to entries in the batch scored training dataset;
    determine whether a drift exists between the scored requests and the training dataset based on distribution of scored requests relative to the batch scores in the training dataset;
    determine whether the drift is statistically significant; and
    generate a notification if drift is determined to be statistically significant,
    wherein determining whether drift exists is further comprised of:
        identifying the percentage of records in the incoming scoring requests and the offline training dataset that are based on a variable;
        calculating a difference in the two percentages;
        calculating the natural log of percentages of records that are based on the variable in the incoming scoring requests and offline training dataset; and
        combine the calculated differences in the two percentages and the calculated natural logs.

2. The computer-implemented method of claim 1, wherein determining whether a drift is statistically significant is comprised of determining whether a combined result is above a threshold.

3. The computer-implemented method of claim 1, wherein determining whether a drift is statistically significant is based on model prediction and score distributions.

4. The computer-implemented method of claim 1, wherein determining whether a drift is statistically significant is based on model variable profiling statistics.

5. The computer-implemented method of claim 1, wherein determining whether a drift is statistically significant is based on time window comparison and rate of change.

6. The computer-implemented method of claim 1, wherein determining whether a drift is statistically significant is based on model variable predictive power and/or relative importance.

7. The computer-implemented method of claim 1, wherein determining whether a drift is statistically significant is based on risk factor associated with the identified drift.

8. The computer-implemented method of claim 1, wherein determining whether the scored requests should be compared to the entries in the batch scored training dataset is comprised of determining whether a scored comparison window is equivalent to a training window.

9. The computer-implemented method of claim 8, wherein a configurable analysis time window is used to compare the batch scored training dataset with scored data.

10. The computer-implemented method of claim 9, wherein a configurable analysis time window represents an amount of time that is evaluated when comparing real time events to a historical baseline to determine if drift is occurring.

11. The computer-implemented method of claim 10, wherein a configurable time window for comparison is established based on variance tolerance.

12. The computer-implemented method of claim 11, wherein the configurable analysis time window for comparison is established based on velocity and/or volume of data.

13. The computer-implemented method of claim 11, wherein the configurable analysis time window for comparison is established based on anticipated rate of change of input data.

14. The computer-implemented method of claim 11, wherein the configurable analysis time window for comparison is established based on a risk associated with drift occurring.

15. The computer-implemented method of claim 11, wherein the configurable analysis time window for comparison is established based on an immediacy of remediation.

* * * * *